US006263554B1

(12) United States Patent
Lyne, Jr.

(10) Patent No.: US 6,263,554 B1
(45) Date of Patent: Jul. 24, 2001

(54) SYSTEM FOR INSTALLING CHAINS ON VEHICLE TIRES

(76) Inventor: Robert Chamberlayne Lyne, Jr., 10207 Maremont Cir., Henrico, VA (US) 23233

(*) Notice: Subject to any disclaimer, the term of this patent is extended or adjusted under 35 U.S.C. 154(b) by 0 days.

(21) Appl. No.: 09/471,664

(22) Filed: Dec. 24, 1999

Related U.S. Application Data

(63) Continuation of application No. 09/033,886, filed on Mar. 3, 1998, now abandoned.
(60) Provisional application No. 60/039,794, filed on Mar. 4, 1997.

(51) Int. Cl.[7] ..... B23Q 17/00

(52) U.S. Cl. ..... 29/407.01; 81/15.8; 152/213 R; 254/88; 29/429

(58) Field of Search ..... 152/213 R, 217; 81/15.8; 29/428, 429, 407.01, 407.09; 254/88

(56) References Cited

U.S. PATENT DOCUMENTS

| | | | | |
|---|---|---|---|---|
| 1,067,940 | * | 7/1913 | Rohe | 152/213 R |
| 1,121,869 | * | 12/1914 | Rohe | 81/15.8 |
| 1,189,632 | * | 7/1916 | Seitz | 254/88 |
| 2,022,804 | * | 12/1935 | Garey | 254/88 |
| 2,469,614 | * | 5/1949 | Sweeney | 81/15.8 |
| 2,532,149 | * | 11/1950 | Cone | 254/88 |
| 2,588,568 | * | 3/1952 | Peterson | 81/15.8 |
| 2,604,802 | * | 7/1952 | Rhoads et al. | 81/15.8 |
| 2,768,545 | * | 10/1956 | Bertelsen | 81/15.8 |
| 2,865,422 | * | 12/1958 | Royer | 81/15.8 |
| 2,990,737 | * | 7/1961 | Smith-Miller | 81/15.8 |
| 3,114,406 | * | 12/1963 | Epes | 152/213 R |
| 3,381,556 | * | 5/1968 | Pisciotta | 81/15.8 |
| 3,585,883 | * | 6/1971 | Insam | 81/15.8 |
| 3,618,653 | * | 11/1971 | Stellas | 152/213 R |
| 3,722,330 | * | 3/1973 | Smekens | 81/15.8 |
| 3,756,097 | * | 9/1973 | Whitlock | 81/15.8 |
| 3,797,685 | * | 3/1974 | Frost | 414/430 |
| 3,865,168 | * | 2/1975 | Bourcier | 152/213 R |
| 3,870,093 | * | 3/1975 | Driggers | 81/15.8 |
| 3,893,500 | * | 7/1975 | Planz | 152/213 R |
| 3,937,263 | * | 2/1976 | Hill et al. | 152/213 R |
| 4,031,939 | * | 6/1977 | De Martini | 254/88 |
| 4,103,870 | * | 8/1978 | Murakami | 81/15.8 |
| 4,194,724 | * | 3/1980 | Masegian | 254/88 |
| 4,249,657 | * | 2/1981 | Bates | 206/335 |
| 4,269,249 | * | 5/1981 | McLean | 81/15.8 |

(List continued on next page.)

FOREIGN PATENT DOCUMENTS

| | | | | |
|---|---|---|---|---|
| 155837 | * | 3/1939 | (DE) | 81/15.8 |

*Primary Examiner*—S. Thomas Hughes
*Assistant Examiner*—Marc Jimenez

(57) ABSTRACT

A drive-on system for installing a twist-link tire chain (i.e., snow chain) on a pneumatic tire mounted on a vehicle wheel. The system includes a U-shaped installation tool whose arms releasably engage fastening elements (hooks or links) at one end of each side chain, and a installation tray or ramp in which the tire chain and the tool are arranged, and may be stored, in a partially laid-out orientation prior to installation. To install the tire chain, the vehicle is driven onto the tray and stopped in response to a signal initiated by a position-indicating switch on the tray. Then the tool, with one end of the tire chain connected to it and trailing it, is drawn upward and circumferentially around the tire. With the tool bridging the tread of the tire so that its arms extend along the opposite sidewalls, the tire chain is draped and tensioned substantially in the correct position on the tire. The fastening element at the other, free end of each side chain is then removed from its place in the tray and connected to the mating fastening element. The connection on the inner sidewall is preferably made while the tool is still connected, which enables the arm of the tool on the inner sidewall to be used to guide the free element into contact and connection with the element connected to the tool.

14 Claims, 10 Drawing Sheets

U.S. PATENT DOCUMENTS

| | | | | |
|---|---|---|---|---|
| 4,487,314 | * 12/1984 | Stewart | ................................ | 81/15.8 |
| 4,703,675 | * 11/1987 | Dalaba | ................................ | 81/15.8 |
| 4,708,035 | * 11/1987 | Artzi | ................................ | 81/15.8 |
| 4,709,432 | * 12/1987 | Barrick | ................................ | 81/15.8 |
| 4,794,823 | * 1/1989 | Nakajima | ................................ | 81/15.8 |
| 5,048,376 | * 9/1991 | Faanes | ................................ | 81/15.8 |
| 5,056,206 | * 10/1991 | Poulsen | ................................ | 29/428 |
| 5,079,976 | * 1/1992 | Priest | ................................ | 81/15.8 |
| 5,180,262 | * 1/1993 | Westerdale | ................................ | 410/12 |
| 5,219,466 | * 6/1993 | Stout | ................................ | 152/213 R |
| 5,221,380 | * 6/1993 | Wilson et al. | ................................ | 152/213 R |
| 5,236,026 | * 8/1993 | Springer | ................................ | 152/213 R |
| 5,255,577 | * 10/1993 | Keefauver | ................................ | 152/213 R |
| 5,273,092 | * 12/1993 | Simpson | ................................ | 152/213 R |
| 5,279,346 | * 1/1994 | Summey | ................................ | 152/213 R |
| 5,297,605 | * 3/1994 | Littell | ................................ | 152/213 R |
| 5,400,846 | * 3/1995 | Bowman | ................................ | 152/213 R |

* cited by examiner

FIG.2
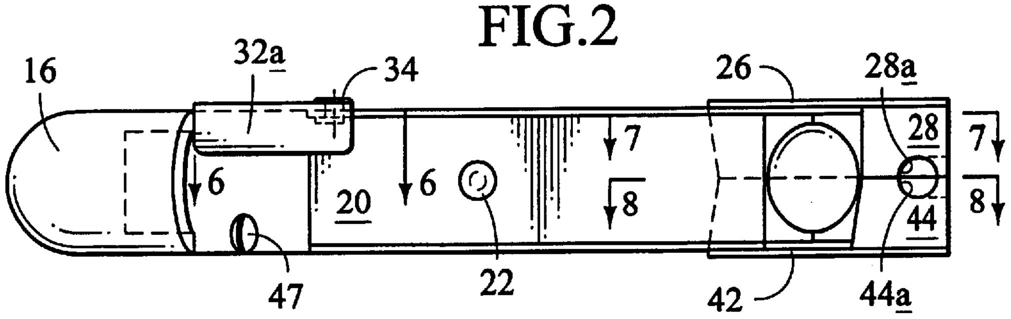
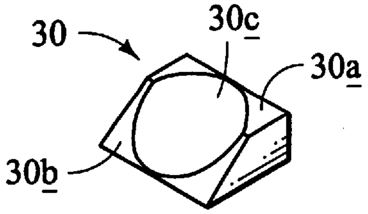
FIG.15
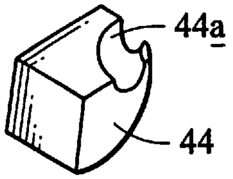
FIG.16
FIG.3
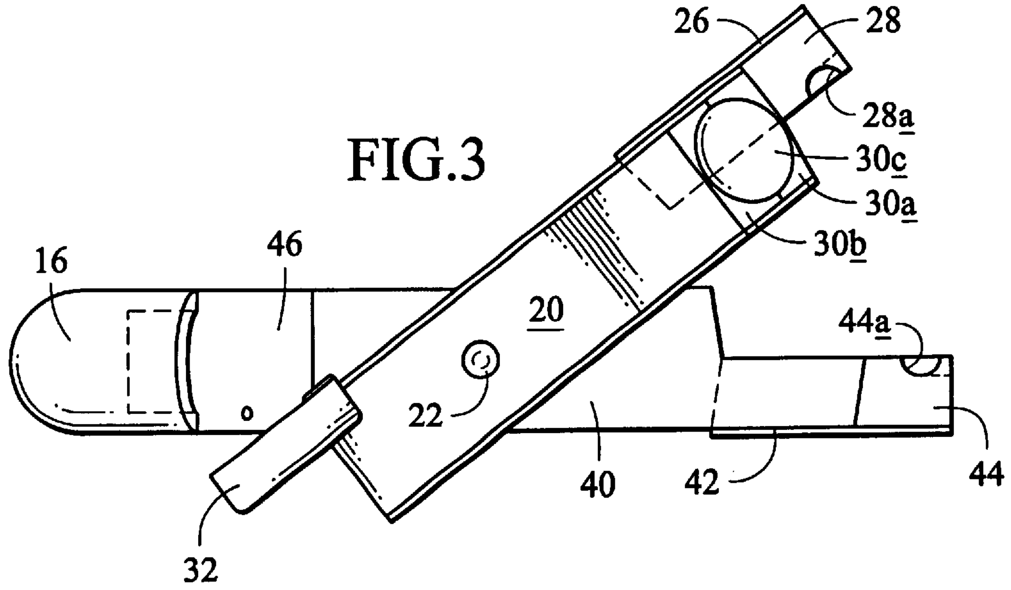
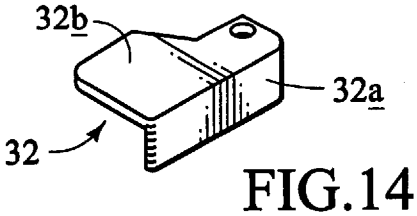
FIG.14

SYSTEM FOR INSTALLING CHAINS ON VEHICLE TIRES

RELATED APPLICATIONS

This application is a continuation-in-part of patent application Ser. No. 09/033,886 filed Mar. 3, 1998, which discloses and claims subject matter disclosed in provisional patent application Serial No. 60/039,794, filed Mar. 4, 1997. Both earlier applications are titled System for Installing Chains on Vehicle Tires. Application Ser. No. 09/033,866 is not abandoned.

TECHNICAL FIELD

This invention pertains to the field of installing traction-enhancing chains on pneumatic tires of wheeled vehicles, for use on mud, snow, and ice surfaces.

BACKGROUND ART

The advantages of tire chains have been known for many years. When needed, tire chains provide enhanced traction on mud, snow, and ice surfaces, both for moving and for stopping the vehicle. Also, tire chains are relatively inexpensive and do not affect vehicle ride, handling, fuel economy, or performance when they are not necessary, which is at least 99 percent of the time for 99 percent of the people in the United States.

Also known are the disadvantages of tire chains, which, assuming well designed chains are properly selected for a given vehicle, tend to fall into three categories. The first category is installation. The disadvantages within this category include the considerable time required for installation and the physical difficulty and discomfort involved, often under adverse weather conditions, darkness, or stress. They may further include, depending upon whether a jack is employed, safety considerations or the need to re-adjust the chains after the vehicle has been driven. These disadvantages are described further in the patents identified below and in other patents in U.S. Patent and Trademark Office subclasses 152/213R and 81/15.8. The second category of disadvantages is operation of the vehicle after the chains have been installed. These disadvantages include chain wear and breakage, limitations on vehicle speed, vibration and accelerated wear of the vehicle, possible damage to the vehicle resulting from breakage of worn chains, and damage to the pavement. These disadvantages are greatly amplified by operation of the vehicle on bare pavement. The third category is removal of the chains from the tire.

These three categories of disadvantages are directly related, in that solutions to installation and removal problems ameliorate problems during vehicle operation. This is because, as a practical matter, the ability to install and remove tire chains quickly and easily enables the user to remove them as soon as the vehicle reaches bare pavement, knowing that the tire chains can be readily reinstalled as soon as (or if) they are needed again. Theoretically, perfect solutions to the installation problems and removal problems would eliminate nearly all of the operating problems. That is, if tire chains could be installed instantly by a mere snap of the driver's fingers immediately before serious snow or ice are encountered, and removed in the same manner when no longer needed, their above-mentioned operating disadvantages would disappear.

Some solutions involve ramps having spaced lateral grooves. After the tire chain is laid out with its cross chains lying loosely in the grooves, the vehicle is driven onto the ramp. The grooves allow the cross chains to be adjusted to positions where the necessary degree of tension can be attained before the ends of the chain are connected. See, for example, Garey U.S. Pat. No. 2,022,804. Ramps are most efficiently used in pairs, one pair for each pair of drive wheels. A problem presented by ramps is the difficulty of stopping the vehicle at the desired position on the ramp. One approach to solving this problem is to provide a stop for the wheel, as disclosed for example in Rhoads et al U.S. Pat. No. 2,604,802. This approach is not always effective, because under actual conditions it is difficult for the driver to feel the stop through the vehicle and distinguish it from other bumps, and he or she may drive the vehicle over the stop. A better approach is to signal the driver that the vehicle has reached the correct position, as taught for example by Masegian U.S. Pat. No. 4,194,724. Another significant improvement in ramps was the provision for storage with the chain oriented on the ramp, which Planz U.S. Pat. 3,893,500, "Chain Caddy", accomplished by upstanding edges on the ramp.

Other solutions to the problems of installing tire chains involve tools for engaging end elements of the chain to facilitate handling. Examples are Nakata U.S. Pat. No. 4,210,036 (hinged elongated rod) and Dalaba U.S. Pat. 4,703,675 (i-shaped spring clip to hold end of chain to tire during rotation to wind chain on tire).

Other solutions avoid the use of a jack or a ramp by applying a tire chain configured so that its ends can be connected with the cross chains nearest the ends outside the footprint of the tire and no chain beneath the footprint. This involves a compromise between ideal spacing between cross chains and achieving proper tension, and usually requires driving and stopping the vehicle after the tire chains have been installed and re-adjusting then. Also, a popular way of accomplishing this installation is to use a large hoop as an integral part of each tire chain. The hoop makes the tire chain difficult to store and handle and may require the user to hug the tire when connecting its opposite ends at the inner sidewall.

Despite the large number of patents directed to solving the problems of installing a tire chain, there remains a need for a single system which is capable of performing all of the following functions:

(a) storing an oriented tire chain having conventional side chains;

(b) handling and positioning the ramp and chain with respect to the tire before the vehicle is driven;

(c) correctly positioning the tire with respect to the chain when the vehicle is stopped;

(d) placing the chain, untwisted, on the tire in approximately the correct position;

(e) adjusting and tensioning the chain;

(f) ascertaining the location of the fastening elements at the end of the chain; and (g) positively connecting those elements.

Such a system should accomplish the foregoing in the following manner:

(h) without fumbling or unsuccessful attempts by the user;

(i) while minimizing or eliminating contact of the user's hands with the chain, or the user's body with the ground or snow;

(j) without requiring exceptional mechanical ability, strength, or dexterity on the part of the user;

(k) simply, reliably, and inexpensively; and (l) quickly. Generally speaking, the last requirement, "quickly", embraces many of the other requirements and will be the major factor determining the efficacy of the system.

SUMMARY OF THE INVENTION

The present invention is a drive-on system for installing tire chains, including storage and handling, on a pneumatic tire mounted on a vehicle wheel. Its object is to meet the need described above in the manner described above.

The inventive system utilizes a U-shaped installation tool having arms extending outwardly from opposite ends of a transverse body member or handle. Movable clasp mechanisms at the ends of the arms releasably but securely engage an end element at one end of each side chain. The arrangement of the elements of the tool corresponds roughly to the anatomy of a hardshell crab.

The system also utilizes a tray-like device in which the tire chain and the tool are arranged, and may be stored, in a partially laid-out orientation prior to installation. This device, which performs the function of the ramps and chain caddy referred to above, will be referred to hereinafter as an "installation tray" or "tray". The installation tray has longitudinal channels and transverse channels for holding laid-out side chains and cross chains, respectively, and a well for holding side chains and cross chains which are not laid out. The installation tray also has a compartment adjacent the well for holding the tool and protecting it from damage due to the weight of the vehicle.

The method of installing the tire chain is as follows. The untwisted tire chain is arranged in the tray with the tool connected to it, as described above. The vehicle is driven onto the tray and stopped when the vehicle is in a predetermined, optimum position with respect to the tray and chain. Holding the handle, the user draws the tool, with one end of the tire chain trailing it, upward and circumferentially around the tire. With the tool bridging the tread of the tire so that its arms extend along the opposite sidewalls, the tire chain is disposed and tensioned substantially in its correct position on the tire. The fastening element at the other, free end of each side chain is then brought up and connected to the mating fastening element. The connection of the side chain elements on the inner sidewall may be made while the tool is still connected to the fastening element, which enables the arm of the tool on the inner sidewall to be used to guide the free element into contact and connection with the element connected to the tool. In most cases this eliminates the need for the user to see the two elements being connected and the need to hold the two elements with both hands simultaneously, so that the user does not need to lie on the ground. After the tool is disconnected from the chap, the vehicle is driven off the tray.

The system according to the invention may include additional features. The inner arm of the tool may have flanges defining a channel for guiding the free fastening element into proximity and contact with the fastening element held by that arm. An inclined ramp-like surface may be disposed in that channel. The tray may have slots for locating and restraining the free fastening elements, and stacking lugs and recesses to permit a plurality of trays to be stacked during storage. A device may be provided in a recess in the tray to sense the position of the tire and initiate a signal to stop the vehicle. The position of the signal-initiating device relative to the transverse channels in the tray may be adjustable. Preferably the signal issues when, and only when, the tire is positioned within a predetermined zone defined by boundaries spaced along the longitudinal axis of the tray, so that the device is able to sense and signal the stopped position of the tire as well as the position of the tire while it is still moving. The chain elements held by the arms of the tool may be released therefrom by the action of a readily accessible latch controlled by the user. Force for opening the claws of the tool may be applied to the open latch. The handle of the tool may be articulated to permit the claws of the two arms, and the elements of the chain they hold, to be brought close to each other. The tool may have features which enable it to be easily adapted and used for tires of different sizes.

BRIEF DESCRIPTION OF THE DRAWINGS

FIG. 2 is a left side view of the tool shown in FIG. 1, showing the inner arm in a closed, confining position.

FIG. 3 is a view similar to FIG. 2, with the stop screw removed and the claws in an exaggeratedly open, releasing position.

FIG. 14 is a perspective view of the latch of the inner arm of the tool shown in FIGS. 1, 2, and 3.

FIG. 15 is a perspective view of the ramp-like member of the inner arm shown in FIGS. 1, 2, 3, 7, and 8.

FIG. 16 is a perspective view of the bottom claw of the inner arm shown in FIGS. 1, 2, 3, and 8.

Figures 1, 6, 7, 8, 9, 10, 11, 12, 13:
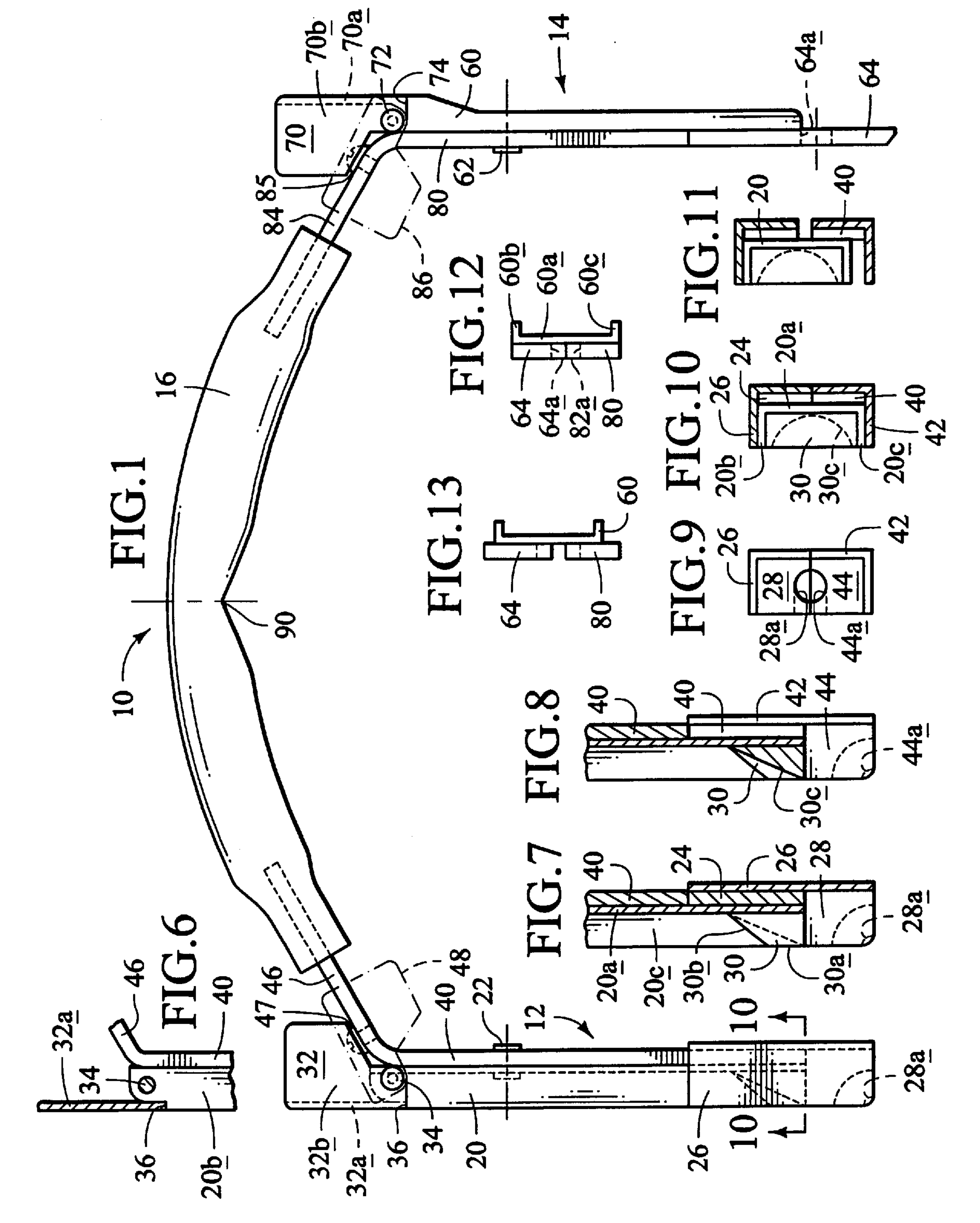
FIG. 1 is a plan view of a tool according to the invention.
FIG. 6 is a view of a section taken at 6—6 in FIG. 2, along the top surface of the top member.
FIG. 7 is a view of a section taken at 7—7 in FIG. 2, along the bottom surface of the top flange of the top member.
FIG. 8 is a view of a section taken at 8—8 in FIG. 2, along the axis of symmetry of the top member.
FIG. 9 is a front elevation view of the inner (left) arm of the tool shown in FIG. 1.
FIG. 10 is a section view taken at 10—10 in FIG. 1.
FIG. 11 is a view similar to FIG. 10, with the claws of the tool slightly open.
FIG. 12 is a front elevation view of the outer (right) arm of the tool shown in FIG. 1.
FIG. 13 is a view similar to FIG. 12, with the claws of the tool slightly open.

The drawings show the tool and the tray approximately to scale. The actual distance between the inner and outer arms of the tool as shown is 8.25 in. The Actual length of the tray as shown is 33.0 in.

DESCRIPTION OF THE PREFERRED EMBODIMENT

Definitions

The following terms will be used throughout this application in accordance with these definitions, unless a different interpretation is required by the context.

The term "tire" refers to an inflated tire mounted on a rim which is a component of a wheel on a vehicle. The tire has a tread which joins 2 sidewalls—an "inner" sidewall toward the shaft driving the wheel and an opposite, "outer" sidewall. The terms "inner" and "outer" will be used in a similar manner to refer to an arm of the tool intended to be used adjacent a sidewall. The "width" of the tread is the distance between its edges, in the direction parallel to the axis of rotation of the wheel. The "maximum width" or "section width" of the tire is its maximum width in a direction parallel to the wheel's axis of rotation and is conventionally the nominal width of the tire. The "radius" of the tire is the distance from the axis of rotation to the ground. The "footprint" of the tire is the portion of its tread which is in contact with the ground. The "bottom dead center" or "BDC" of the tire is the line where its bottom surface intersects a vertical plane including the axis of rotation; the BDC will be approximately at the center of the footprint when the tire is resting on a flat surface.

The term "tire chain" refers to what is installed or is intended to be installed on a single tire. "Tire chain" and "snow chain" are synonyms. A tire chain includes side chains and cross chains joined together. The term "chain" alone will be used to refer to any two or more elements of a tire chain. The term "element" refers to any element of a side chain or a cross chain, such as a link, a "cross chain hook" connecting a cross chain with a side chain, or a fastening hook at an end of a side chain. The term "locking hook" will refer to a fastening hook having a camming or locking mechanism. The term "open hook" will refer to a rigid fastening hook of the type normally used adjacent the inner sidewall of the tire. A fastening hook and the link at the opposite end of the side chain to which it is or is intended to be connected will be said to be "mating". The term "fastening element" will refer to a hook or a mating link. The term "free", as used with reference to a chain element, means that the element is not connected to the tool, and thus may refer to an element held by the user or restrained by a holder on the tray. The term "side chain circle" will refer to a circle drawn through the angles of a polygon formed by a side chain installed on a tire.

A "connection angle" is the angular position on the tire where, after the tire chain has been properly draped and tensioned, the fastening elements on opposite ends of a side chain are connected; the connection angle is measured from the BDC about the axis of rotation of the wheel. The term "interference" will refer to contact of the tool or the hands of the user with a nearby portion of the vehicle (e.g., fenders, mudguards, frame, brakes, steering mechanism, or shock absorbers). The term "clearance" will refer to distance between the tire and such a portion of the vehicle which limits positioning or operation of the tool or the hands of the user.

The terms "front" and "rear" will be used consistently to refer to the installation tray as though it were a garage. That is, the tire is intended to enter the front of the tray and stop before it reaches the rear. Similarly, the terms "front" and "rear" will to refer to the installation tool in its orientation when lying in the installation tray, but when the tool is in a different orientation will not correlate to those terms as applied to the tray. As used with respect to the tray and tool, "front" and "rear" will not necessarily correlate to the direction the vehicle is driven or its orientation. To avoid confusion, the terms "in low gear" will refer to driving the vehicle with the transmission in drive, low gear, or another forward gear, and "in reverse" will refer to driving the vehicle with the transmission in reverse.

Tool

Installation tool 10 consists of inner arm 12 and outer arm 14 extending from opposite ends of transverse handle or body member 16. As shown in FIGS. 1 and 3, inner arm 12 consists of top member 20 and bottom member 40 pivotally connected by rivet 22.

Top member 20 is channel-shaped, with web 20*a* joining top flange 20*b* and bottom flange 20*c*; see FIG. 10. Spacer 24, claw holder 26, and claw 28 are fixed to the front of top member 20 by fasteners or adhesive (not shown). Claw 28 has in its flat, horizontal surface a groove 28*a* which curves in a 90 degree circular arc and has a semicircular cross section; see FIGS. 2, 3, 8, and 9. Abutting the rear of claw 28 is ramp-like member 30 fixed in the channel of top member 20; see FIGS. 2, 3, 7, 8, and 15. Ramp-like member 30 has flat surface 30*a* parallel to web 20*a* and flat surface 30*b* inclined so that it extends from the level of web 20*a* to the level of claw 28. A cylindrical cavity in surfaces 30*a* and 30*b* creates a concave surface 30*c* extending from claw 28 to web 20*a*. At the rear end of top member 20 is latch 32, which comprises side leg or panel 32*a* and top leg or panel 32*b*; see FIGS. 1, 2, 3, 6, and 14. Latch 32 is pivotally connected to top flange 20*b* by rivet 34. By contacting the front end of latch side panel 32*a*, stop surface 36 on top flange 20*b* limits rotation of latch 32 in the inward direction (to the left as shown in FIGS. 1 and 6). This is the open or unlatched position of latch 32, since it allows top member 20 and bottom member 40 to pivot about rivet 22 as shown in FIG. 3. Friction at rivet 34 keeps latch 32 in the latched position until the user rotates it to the unlatched position. If additional resistance to accidental rotation is desired, a pinhead-size, downwardly embossed button detent (not shown) can be provided in top panel 32*b* at a location spaced from side panel 32*a* by a distance equal to the thickness of angular member 46.

As shown in FIGS. 3, 8, and 9, claw holder 42 and claw 44 are fixed to the front end of bottom member 40. Like claw 28, claw 44 has groove 44*a* which curves in a 90 degree circular arc and has a semicircular cross section; see FIG. 16. At its rear end, bottom member 40 merges at a 60 degree angle into angular member 46 which receives stop screw 47 and is part of the handle. By abutting latch side panel 32*a*, angular member 46 limits the rotation of latch 32 in the outward direction (right in FIG. 1), as shown by phantom lines 48. This is the latched position of latch 32, since its top panel 32*b* is blocked by angular member 46 and thus top member 20 and bottom member 40 cannot pivot about rivet 22.

When latch 32 is in the unlatched position, a squeezing force applied to top panel 32*b* and the bottom surface of handle 16 causes top member 20 and bottom member 40 to pivot about rivet 22 like pliers, and separates claws 28, 44. The pivotal movement stops when latch top panel 32*b* contacts stop screw 47. When claws 28, 44 are together, their grooves 28*a*, 44*a* are aligned to form a curved 90 degree passage having a circular cross section. As will be described later, the claws will positively and securely engage and hold an element of a side chain, and they will continue to confine the element as long as latch 32 is in the latched position, in such a manner that the arm of the tool will remain in this configuration and connected to the element during storage, handling, and installation of the tire chain, irrespective of the relative positions of the element and the arm and irrespective of the directions of forces pulling on them. Claws 28, 44 may clasp the element loosely, and are not intended to grip the element by applying a continuous squeezing force.

Outer arm 14 is similar to inner arm 12. As shown in FIGS. 1, 5, and 13, outer arm 14 consists of top member 60 and bottom member 80 pivotally connected by rivet 62. Top member 60 is channel-shaped, with web 60*a* joining top flange 60*b* and bottom flange 60*c*; see FIG. 12. Claw 64, which has semicircular opening 64*a*, is fixed to the front of top member 60 by fasteners or adhesive (not shown); see FIGS. 4, 5, 12, and 13. At the rear end of top member 60 are latch 70, rivet 72, latch side panel 70*a*, latch top panel 70*b*, and stop surface 74, which are mirror images of those elements of the top member 20 of inner arm 12 and are movable in a corresponding manner; see FIGS. 1, 4, and 5. Directly under latch 70, hanger 76 is pivotally connected to bottom flange 60*c* by rivet 78; see FIGS. 4 and 5. The configuration of hanger 76 is the mirror image of latch 70, and identical to latch 32, except that side leg 76*a* forms hook 77.

Bottom member 80 terminates at its front end in claw 82 which has semicircular opening 82*a*, and at its rear end merges into angular member 84 with stop screw 85. Angular member 84 is a mirror image of angular member 46. The latched position of latch 70 is shown by phantom lines 86.

Except for claws 64, 82, the depths of flanges 60*b*, 60*c*, and hanger 76, the structure and functions of outer arm 14 are essentially mirror images of those of inner arm 12.

Handle 16 is articulated, in that hinge 90 allows claws 28, 44 of inner arm 12 and claws 64, 82 of outer arm 14 to be brought together. Handle 16 is preferably made from a nonmetallic material, so that it will not rapidly conduct heat away from the user's hand. A resilient material such as a section of rubber hose is suitable. The hinge may be created by folding the hose and compressing the fold in a vise, and the ends of the hose may be telescoped over a reduced height portion of members 46 and 84 and fastened with rivets (not shown). This permits easy rotation of handle 16 at hinge 90 in the plane of tool 10, and, with considerably more force, limited rotation out of that plane.

The tool just described is desirably one of a pair used together so that tire chains can be installed on two drive wheels without moving the vehicle more than once. The tools may be used either upside down or right side up (as will be described later), but they have been described in the orientation in which the latch is on top. This orientation is preferred when the end elements of the side chains are being connected, because the latches are more visible and accessible. Thus, assuming that the latches will be up (i.e., exposed to the user) when the connections are made, the tool just described is intended for use on the driver side (left) wheel if the tray will be placed in ahead of the wheel and the vehicle driven in low gear onto it, or on the passenger side wheel if the tray is being placed behind the wheel and the vehicle driven in reverse onto it. For the other two situations (driver side/in reverse and passenger side/in low gear) the second tool of the pair will be the mirror image of the tool just described. The terms "top" and "bottom", as applied to members 20, 40, 60, 80, are merely to identify these parts for convenience in describing them. The length and spacing of arms 12, 14 will vary with the radius and width of the tire, as will be described later.

Tray

Figure 17:
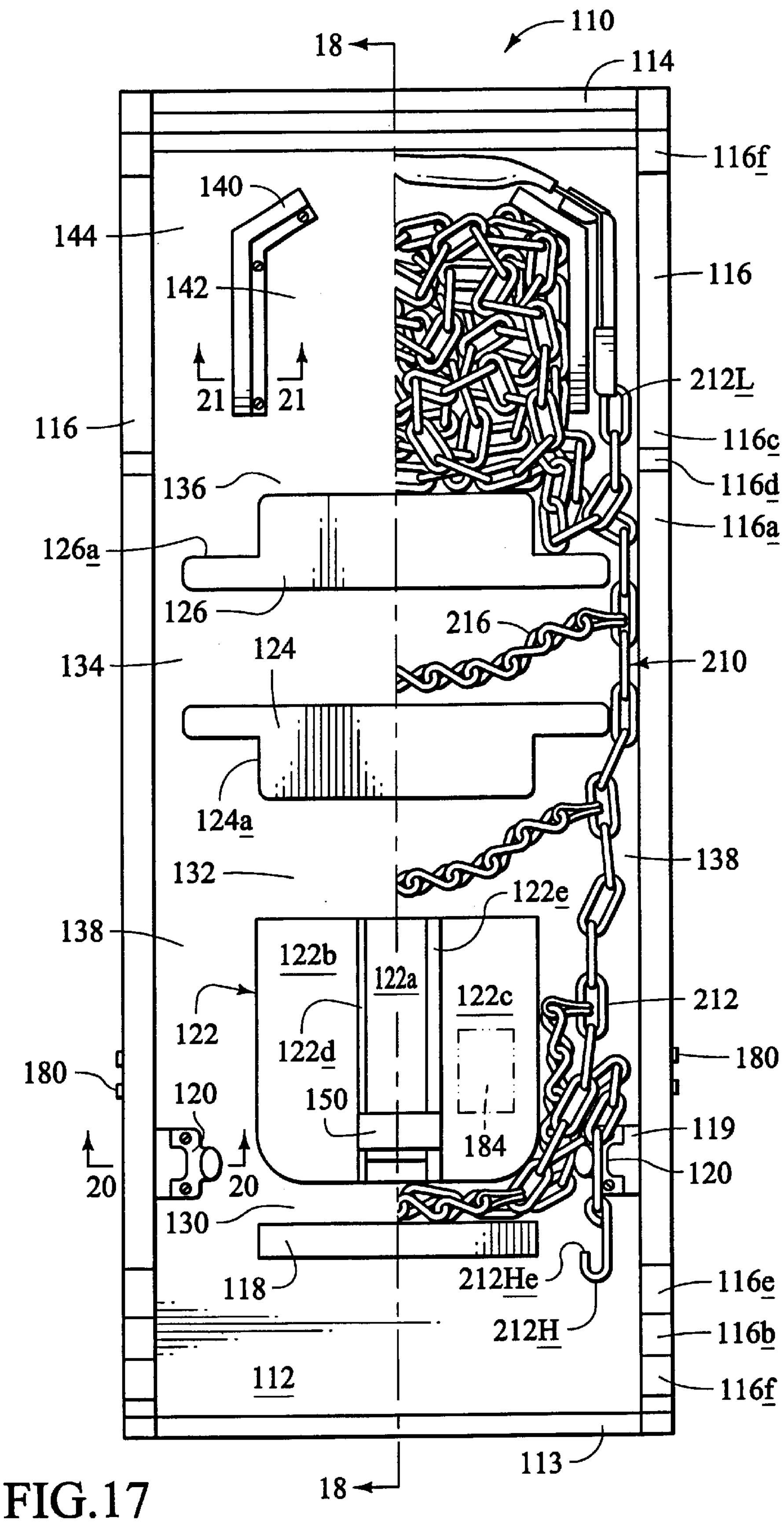
FIG. 17 is a plan view of a tray according to the invention with the right hand side shown loaded with an oriented tire chain connected to a tool.
Figure 18:
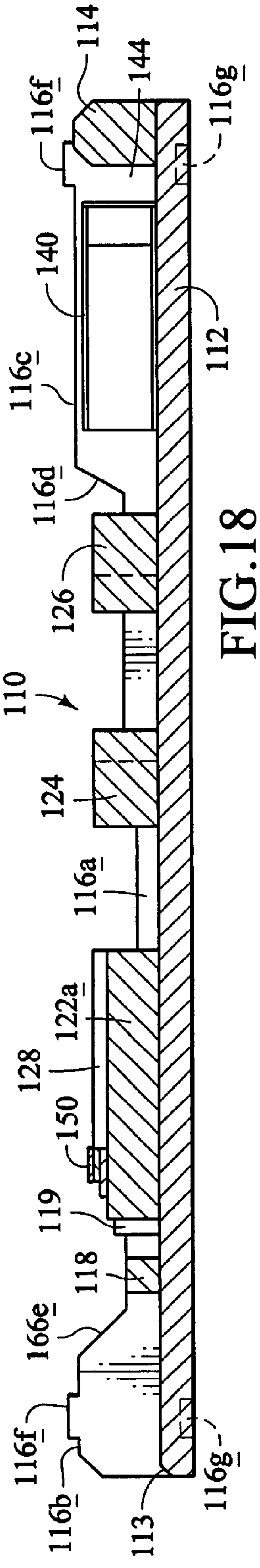
FIG. 18 is a section of FIG. 17 taken at 18—18.
Figure 21:
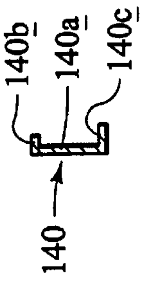
FIG. 21 is a section of FIG. 18 taken at 21—21.
Figure 20:
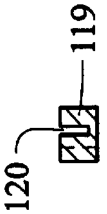
FIG. 20 is a section of FIG. 17 taken at 20—20.
Figure 19:
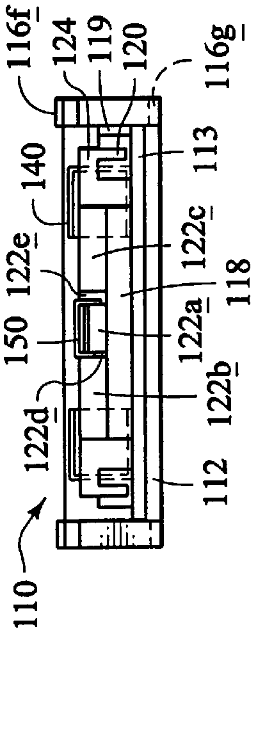
FIG. 19 is a front elevation view of the tray shown in FIG. 17, without a tire chain and tool.
Figure 22:
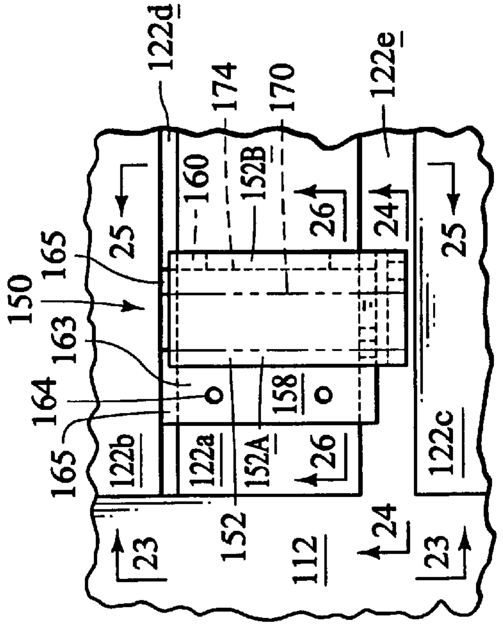
FIG. 22 is an enlarged, fragmentary view of the portion of FIG. 17 showing the switch.
Figure 23:
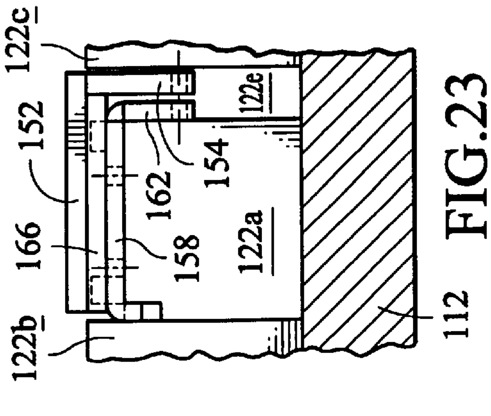
FIG. 23 is a section of FIG. 22 taken at 23—23.
Figure 24:
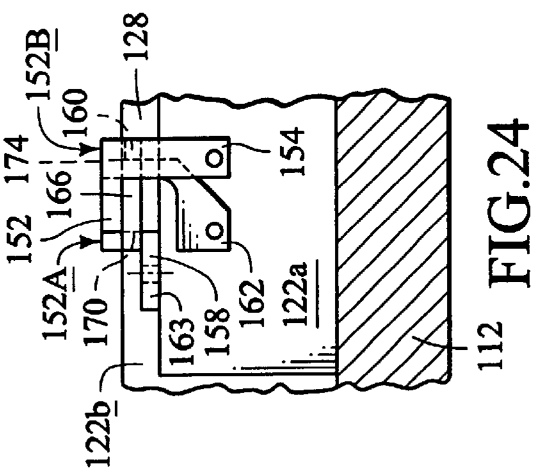
FIG. 24 is a section of FIG. 22 taken at 24—24.
Figure 25:
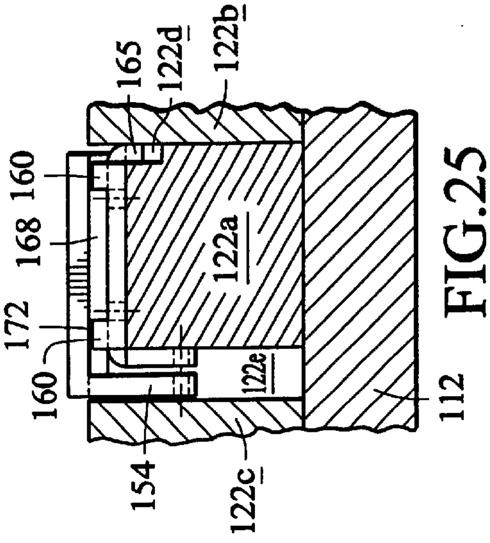
FIG. 25 is a section of FIG. 22 taken at 25—25.

Turning now to tray 110 shown in FIGS. 17–21, and disregarding for the moment the tire chain and tool shown in the right hand side of FIG. 17, base or floor 112 with front, entrance lip 113 has, upwardly extending therefrom, rear wall 114 and side walls 116 joined thereto. Side walls 116 each have a low portion 116*a*, a high portion 116*b* toward the front, another high portion 116*c* toward the rear, step 116*d* between portions 116*c* and 116*a*, and step 116*e* between portions 116*a* and 116*b*. Each side wall 116 also has stacking lugs 116*f* on its top surface and stacking recesses 116*g* in its bottom surface. The bottom surfaces of base 112 and side walls 116 should have teeth or lugs (not shown) which should be large enough to prevent slipping if the tray is used on ice or snow, yet small enough to support the tray without breaking if the tray is used on pavement.

At the front end of base 112 is front wall or step 118. Two chain element holders 119, each with a slot 120, are mounted at opposite sides of tray 110 on either base 112 or side wall 116 so that if necessary they may be readily detached, moved forward or rearward, and reattached in the optimum position to accommodate the cross chain length of the particular tire chain being installed. Between front wall 118 and rear wall 114 are front vehicle support 122, center vehicle support 124, and rear vehicle support 126. Front vehicle support 122 has center portion 122*a*, left portion 122*b*, and right portion 122*c*, which are separated respectively by groove 122*d* and channel 122*e* and define signal-initiating device recess 128. Rear vehicle support 126 is relatively close to walls 116 at its maximum width, which is toward the front of the tray, and has rearward-facing concave surfaces 126*a*. Similarly, center vehicle support 124 is relatively close to walls 116 at its maximum width, which is toward the rear of the tray, and has forward-facing concave surfaces 124*a*.

The front and rear walls 118, 114 and the supports 122, 124, 126 define front transverse channel 130, second transverse channel 132, third transverse channel 134, and rear transverse channel 136. Rear channel 136 is approximately aligned with step 116*d* in side wall 116. Longitudinal channels 138 extend between supports 122, 124, 126 and side walls 116. To the rear of rear support 126 are two interior walls 140. Each interior wall 140 has web 140*a* between inwardly facing flanges 140*b* and 140*c*. Chain well 142 is the generally bell-shaped area defined by interior walls 140, rear support 126 (including concave surfaces 126*a*), and side walls 116, and includes rear transverse channel 136. To the rear and sides of interior walls 140 is U-shaped tool compartment 144. Interior walls 140 are mounted on base 112 so that if necessary they may be readily detached, moved laterally, and reattached in the optimum position to correspond to the width of the particular U-shaped tool 10 being used.

Figure 26:
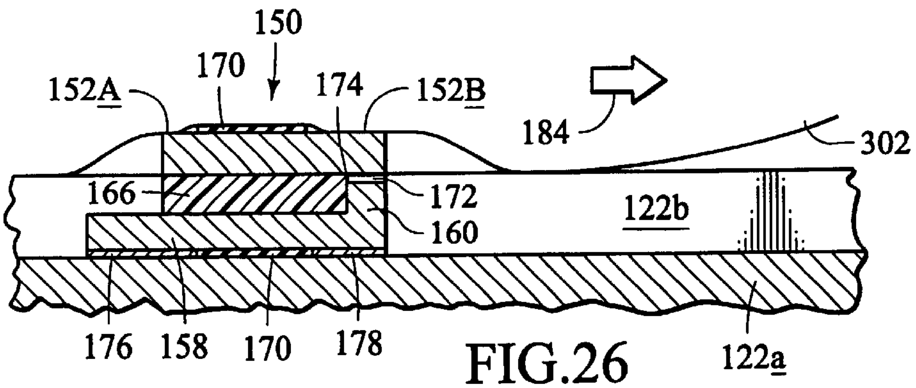
FIG. 26 is an enlarged, fragmentary section of FIG. 22 taken at 26—26 with the leading edge of a tire moving to the right just having passed over the switch, which is in an open position.
Figure 27:
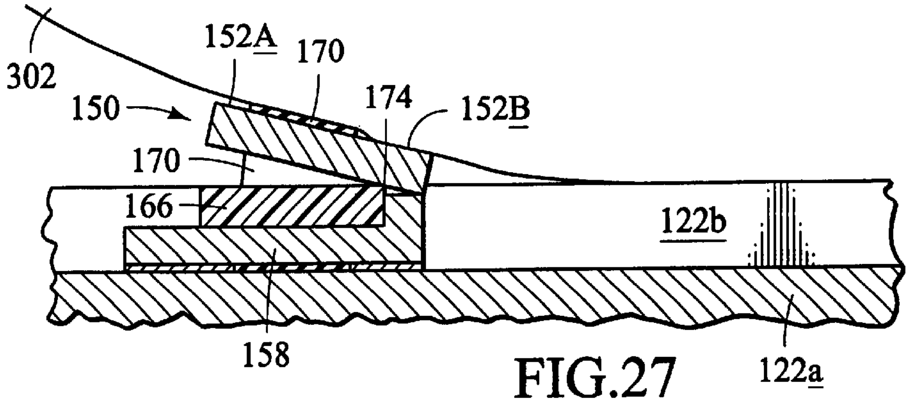
FIG. 27 is a view similar to FIG. 26 with the trailing edge of the tire almost having passed over the switch, which is in a closed position.

As shown in FIGS. 22–28 as well as in FIGS. 17–21, switch 150, which is supported in signal-initiating device recess 128 by front support center portion 122*a*, comprises top, rocking element 152 and stationary, bottom element 158. Top element 152 has front bearing surface 152A, rear bearing surface 152B, and terminal 154. Stationary bottom element 158 has contact posts 160, terminal 162, fastening flange 163 with holes 164, and guide legs 165. The two elements are made of metal or other electrically conducting material. Top element 152 is spaced from bottom element 158 by rigid platform 166 and resilient pad 168, both of which are non-conducting. The components of switch 150 are held together by adhesive and a resilient compression band 170 (depicted by phantom lines) surrounding top element 152 and bottom element 158 and passing between guide legs 165. Top element 152 is not secured to platform 166, but is urged against it by band 170 when switch 150 is in a condition of repose. There is a small gap 172 between each post 160 and the bottom of top element 152. In the absence of a countervailing downward force on front bearing surface 152A, a downward force on rear bearing surface 152B causes top element 152 to rock about fulcrum 174 at the rear of rigid platform 166, against the forces applied by compressed pad 168 and tensioned band 170, until gap 172 is closed and posts 160 contact top element 152, as shown in FIG. 27.

Switch 150 rests on the bottom portion of resilient compression band 170 and on shims 176, 178, and is secured to front support center portion 122*a* by fasteners (not shown) extending through connecting flange holes 164. Terminal 162 and guide legs 165 embrace center portion 122*a* on its left and right sides, respectively, so that switch 150, when it is not so secured, may be slid forward and rearward in recess 128. Switch top element 152 extends out of recess 128 and above the top surface of front support 122.

Two insulated electrical wires (not shown) are connected to terminals 154, 162, extend into channel 122*e*, and then extend through base 112 to two pairs-of terminals 180 at the outside of side walls 116; an audio or d.c. power jack may be substituted for each pair of terminals. Alternatively, the wires may extend from channel 122*e* to compartment 184 within front support portion 122*c*. As will be described later, compartment 184 may contain a sending device (not shown) for either emitting a signal similar to those used in remote keyless entry systems for automobiles or emitting an audible sound, preferably a continuous sound. The wires within channel 122*e* are loose and sufficiently slack that switch 150 may be slid forward or rearward to any position along the axis of recess 128 while the wires remain within channel 122*e*.

Figure 29:
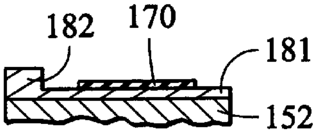
FIG. 29 is a fragmentary view of FIG. 26 showing an alternative embodiment wherein there is disposed on the top surface of the switch an adapter whose elevated portion is toward the front of the tray.
Figure 30:
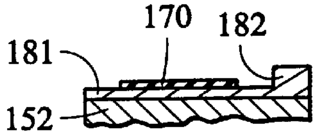
FIG. 30 is a view similar to FIG. 29 with the elevated portion of the adapter toward the rear of the tray.

The profile of the top surface of switch 150 may be varied by adapter 181 with projection 182. As shown in FIGS. 29 and 30, adapter 181 may be retained on top element 152 by resilient compression band 170, with projection 182 either toward the front of the tray or toward the rear of the tray, respectively.

The function of switch 150 is best understood by recognizing that this function could also be performed, at least in theory, by a combination of two separate conventional switches—a normally closed momentary switch at 152A and a normally open momentary switch at 152B—wired so that a circuit is closed when, and only when, there is a downward force at 152B but not at 152A. Switch 150 is preferred over multiple conventional switches because it is simple and durable and thus well suited for its present application, as will become apparent when use of the invention is described later.

Figure 38:
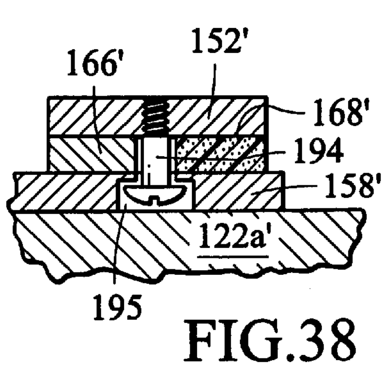
FIG. 38 is an enlarged, fragmentary section of FIG. 34 taken at 38—38.
Figure 39:
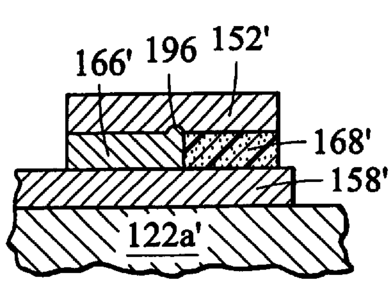
FIG. 39 is an enlarged, fragmentary section of FIG. 34 taken at 39—39.

FIGS. 34–39 show an embodiment of the switch system in which front support center portion 122*a'* abuts front support left and right portions 122*b*, 122*c* and has horizontal, rectangular contact bars 190 recessed in its top surface. Wires (not shown) extending through base 112 connect contact bars 190 to terminals 180 or jacks, as shown generally in FIG. 17. Switch 150' comprises top, rocking element 152' and stationary bottom element 158'. Top element 152' has the general shape of a four-legged footstool, with front legs 191 and rear, contact legs 192. Stationary bottom element 158' has four passages 193 which receive legs 191, 192. Bottom element 158' includes downwardly extending guide legs 165' and fastening flange 163', which has mounting hole 164'. Top element 152' is spaced from bottom element 158' by, and is adhesively bonded or otherwise secured to, rigid platform 166' and resilient pad 168'. As shown in FIG. 38, top element 152' is held loosely in place by retaining screw 194, which is threaded into top element 152' with its head in counterbore 195 in bottom element 158'. Top element 152' is made of metal or other electrically conducting material, or at least is electrically conductive between rear legs 192, while the remainder of switch 150' may be made of either conducting or nonconducting material. A fastener (not shown) extending through mounting hole 164' secures switch 150' to front support center portion 122*a'*. Guide legs 165' embrace center portion 122*a'* to permit switch 150' to be slid forward and rearward along its top surface, within recess 128, when the fastener is removed from mounting hole 164'. Switch top element 152' extends out of recess 128. Legs 191, 192 are spaced from contact bars 190 by small gaps 172'. When a downward force bears on rear bearing surface 152B' of top element 152' but not on its front bearing surface 152A', top element 152' rocks about fulcrum 174 against the force applied by compressed pad 168', until gaps 172' between rear legs 192 and contact bars 190 are closed and rear legs 192 come into contact with contact bars 190. This closes an electrical path between paired terminals 180. Leg-receiving passages 193 should have shapes and clearances with legs 191, 192 which permit free rotation of top element 152' about fulcrum 174 while preventing unnecessary horizontal movement of top element 152' relative to bottom element 158'. In addition, or as an alternative, the top rear edge of rigid platform 166' may have, adjacent to and aligned with fulcrum 174, tongue 196 disposed in a groove in the bottom surface of top element 152', as shown in FIG. 39. In order to reduce the length of switch 150', fastening flange 163' can be eliminated and a countersunk hole for a mounting screw provided through rigid platform 166' and bottom element 158', with an access hole through top element 152'.

Except for the differences just described, switches 150 and 150' are very similar in design and function and respond in the same manner to downward forces on the front and rear bearing surfaces of the top, rocking element. Switch 150' is preferred because it eliminates the need for loose wires, is simpler and sturdier, and does not require wires to be connected to the switch. The description of the invention hereinafter will refer primarily to switch 150, but it will be understood that the description also applies to switch 150' unless otherwise stated.

Loading the Tray

Figure 33:
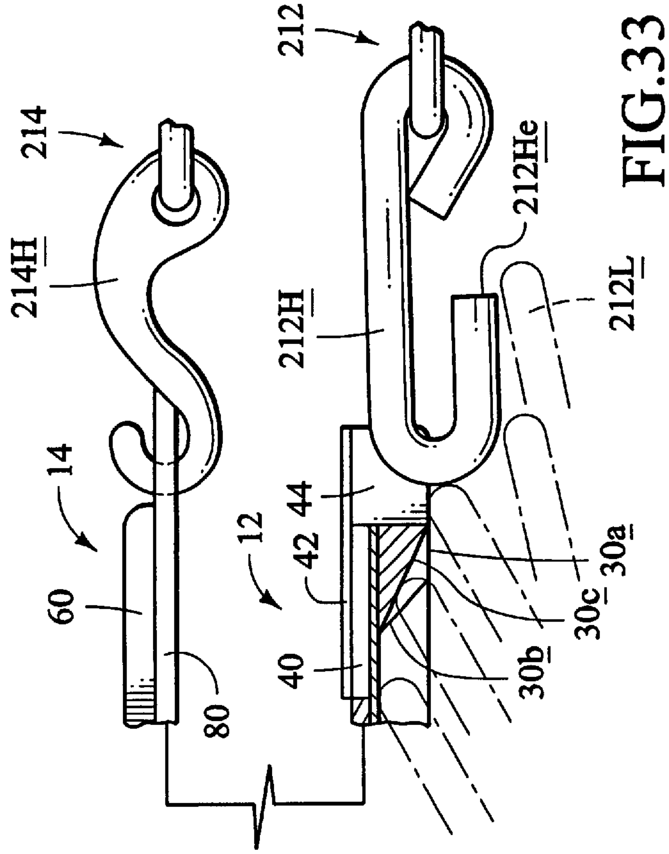
FIG. 33 is a fragmentary view of the tool consisting of a section of the inner arm taken at 8—8 in FIG. 2 and a plan view of the end of the outer arm, with the arms connected to chain hooks.
Figure 32:
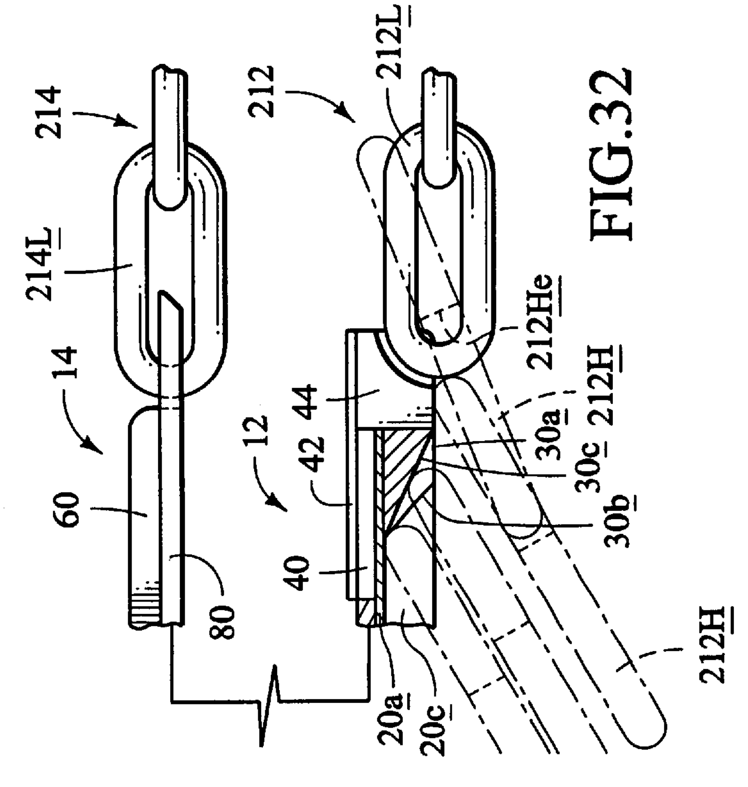
FIG. 32 is a fragmentary view of the tool consisting of a section of the inner arm taken at 8—8 in FIG. 2 and a plan view of the end of the outer arm, with the arms connected to chain links.
Figure 34:
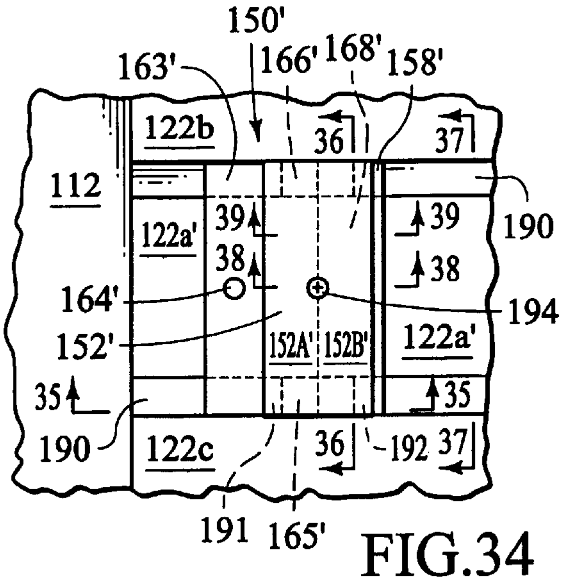
FIG. 34 is an enlarged, fragmentary view of another embodiment of the switch shown in FIG. 17.
Figure 35:
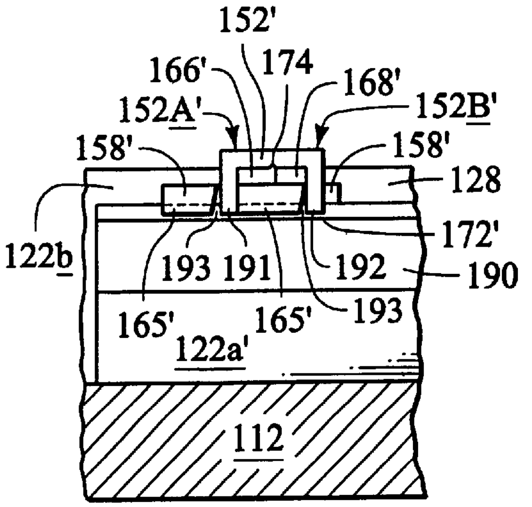
FIG. 35 is a section of FIG. 34 taken at 35—35.
Figure 36:
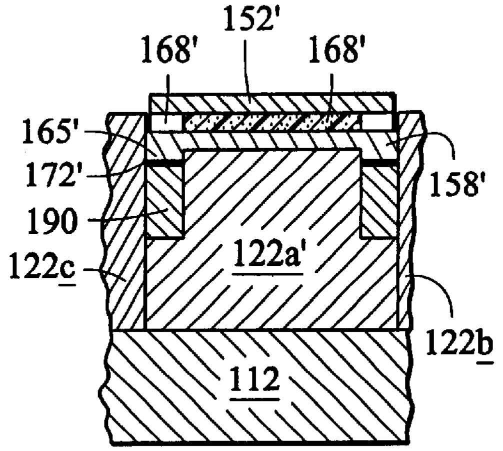
FIG. 36 is a section of FIG. 34 taken at 36—36.
Figure 37:
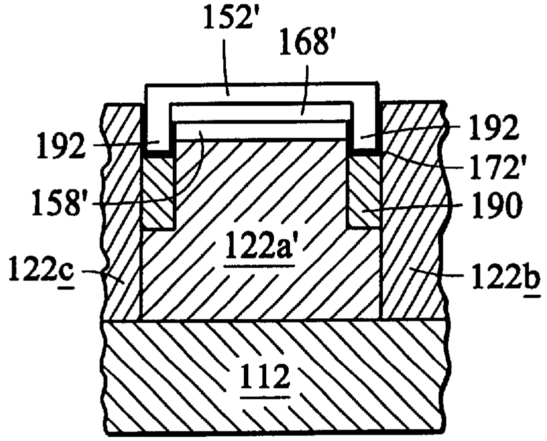
FIG. 37 is a section of FIG. 34 taken at 37—37.

The tire chain is loaded into tray 110 in its proper orientation and connected to tool 10, as shown in the right hand side of FIG. 17, which depicts twist-link, ladder-type tire chain 210 having inner side chain 212, a corresponding outer side chain (not shown in FIG. 17) in left longitudinal channel 138, cross chains 216, fastening hooks comprising inner hook 212H and outer hook 214H, and fastening links comprising inner link 212L and outer link 214L. (Outer side chain 214, outer hook 214H and outer link 214L are shown in FIGS. 32 and 33.) Preferably this is done ahead of time, at a time and place and under conditions chosen by the user for his or her convenience, comfort, and safety.

To load the tray, the tire chain is preferably laid out on a flat surface with the hooks which connect the cross chains to the side chains facing down. Since twisted chain is a frequent cause of tire chain failure, twists should be removed until each side chain is in a relaxed state. If a side chain is not relaxed at a cross chain hook, it can be untwisted by threading the end of the side chain behind the cross chain. This is repeated until the tire chain is completely relaxed.

Figure 31:
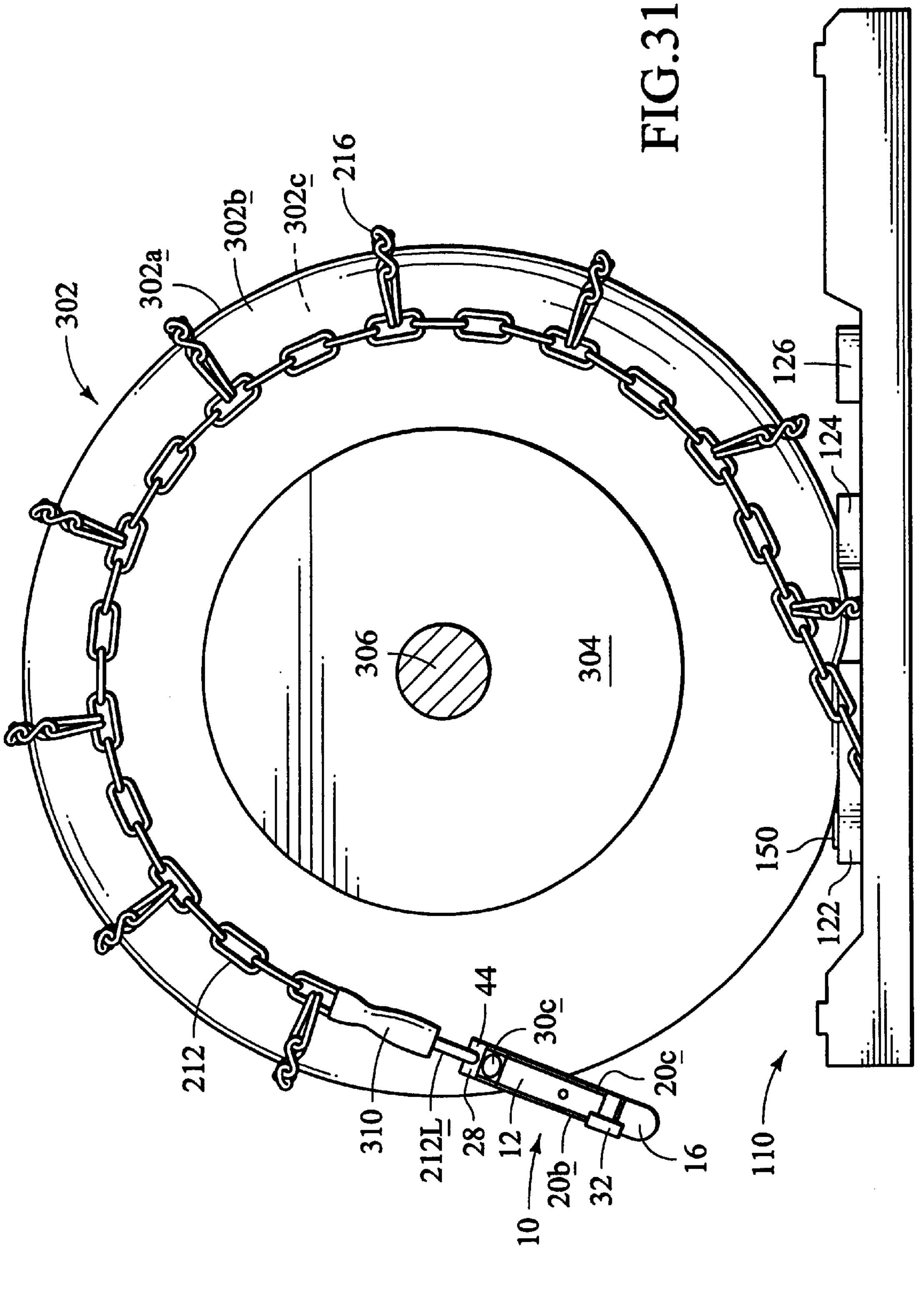
FIG. 31 is an side elevational section view, taken vertically through the axle, of the inside of a wheel resting on a tray with the tool connected to a partially installed chain.

Next, tool 10 is connected to the fastening elements of the side chains at one end of the tire chain. With the tool oriented so that latches 32, 70 are facing down, inner arm 12 will be connected to the side chain which has the open hook, and outer arm 14 will be connected to the side chain which has the locking hook. The connection will be made to the appropriate end of the tire chain—either the end with the hooks or the other end, where the fastening elements are links. If the tool is being connected to the link end, it will be connected to the link which will be eventually connected to the hook when the tire chain is installed, which may not be the endmost link. I recommend pulling each chosen fastening link through a short resilient sleeve, such as narrow bicycle inner tube 310 as shown in FIG. 31, so that the sleeve (not shown in FIG. 17) covers the side chain from the last cross chain to about one-fourth of the chosen link. This isolates the chosen link from the rest of the links, provides some rigidity to the endmost links, makes the endmost links easier to handle, and reduces hand-to-metal contact. Also, if the chosen link is not the endmost link, it also avoids the disadvantages of cutting the excess side chain link(s) or wiring or tying them to the side chain; these disadvantages include, respectively, rendering the tire chain useless for a slightly larger tire and forcing an excess link to protrude too far away from the sidewall. Sleeve 310 can be made more rigid, as for example by making it from a material having a greater wall thickness, such as rubber hose or plastic tubing, thereby making the end of the side chain easier to handle, which is an advantage not only in the fastening of the chain elements but also in the unfastening of them when the tire chains are removed. Also, a similar sleeve may be used as well on the end of the side chain with the mating fastening hook, and the sleeve(s) may be extended past the side chain(s) to provide rigidity over a greater length of side chain, as for example by lengthwise slitting and circumferential taping of the sleeve.

To connect inner arm 12, claws 28, 44 are separated to the open position as described above, the inner fastening element (link or open hook) is placed in groove 28*a* , the claws are closed together by squeezing top claw holder 26 and bottom claw holder 42 as previously described in the description of the tool, and latch 32 is moved to the latched position; see FIG. 32 or 33, disregarding the phantom lines for the moment. At this point the relationship between the link and claws 28, 44 should be noted, since it provides advantages when the tire chain is installed. A small portion of the link (a 90 degree arc at one end of the link) is securely but releasably confined within the passage formed by grooves 28*a*, 44*a*; the remainder of the link is exposed. The claws occupy very little of the interior space within the link (approximately 2 percent). The link, however, cannot rotate about its longitudinal axis, and cannot move longitudinally or transversely with respect to tool arm 20. While it can rotate about a vertical axis, pulling the chain with the tool fixes its rotational orientation to the optimum position when the connection is being made.

Outer arm 14 is then connected to the outer fastening element (link or locking hook) in a similar manner, as shown in FIG. 32 or 33, and latch 70 is latched. Hanger 76 is pivoted against handle 16 so that it is directly beneath latch 70.

Now that tool 10 is connected to the tire chain, approximately one-third of the tire chain at the end remote from the handle is picked up and moved laterally onto tray 110, with the hooks of the cross chains still facing down and with the cross chain farthest from tool 10 fitting into front transverse channel 130. The remaining two-thirds of the tire chain is raised by tool 10 to a vertical position and then lowered and laid down in a Z-folded fashion to fill chain well 142, with the cross chains remaining more or less perpendicular to the longitudinal axis of tray 110 and close together, and the side chains piling up to fill in the cavities. Tool 10 is placed in tool compartment 144. If necessary the chain in chain well 142 is then spread so that it is not piled above rear wall 114 and side walls 116. At the front end of tray 110, the links next to the fastening element at the other end of the tire chain are placed in slots 120, which fixes that end of the tire chain with the fastening elements exposed. The tire chain is now laid out in the tray as shown in the right side of FIG. 17, with the walls of the tray and the supports confining the tool and the various elements of the tire chain so that they remain oriented and cannot become commingled. Tool inner arm 12 is connected to inner fastening link 212L and, as shown in FIGS. 32 and 33, tool outer arm 14 is connected to outer fastening link 214L. Inner fastening hook 212H (shown in FIGS. 32 and 33) and outer fastening hook 214H are held just forward of slots 120.

Of course, while loading the tray has been described with the tire chain being arranged in the tray after being connected to the tool, this sequence may be reversed.

Next, the foregoing is repeated, with the other tire chain being connected to the other tool 10 of the pair and placed in a second tray 110. It should be noted that if the two tire chains are identical, the tool will be connected to the fastening hooks of the second tire chain, and the fastening links of the second tire chain will be just in front of slots 120

(not shown). On the other hand, if the second tire chain is a mirror image of the first (i.e., the first tire chain and the second tire chain are identical, except that the open hook and the locking hook are reversed), the tool will be connected to the same kind of fastening elements (either links or hooks) on both tire chains. In this case it may be preferable to connect the tool to the hooks rather than the links, because connecting the ends of the side chain during installation, which will be described later, becomes slightly easier. In either case the connection of the fastening hooks to tool 10 keeps the hooks from snagging on another portion of the tire chain during storage, handling, and installation.

If the two trays are being used as a pair, with tires being driven onto both trays simultaneously, a switch 150 is required for only one tray, which should be the tray on the driver's side of the vehicle.

Storing the Loaded Tray

The loaded trays are stored by stacking one on the other, with stacking lugs 116*f* of the lower tray fitting into stacking recesses 116*g* of the upper tray. They can be stored indoors or in the vehicle ready for use, preferably with other loaded trays, so that even if a set of tire chains which have been installed are removed because of bare pavement, a fresh set of tire chains can be installed as necessary without having to re-load the removed set of tire chains back into their trays.

Installing the Tire Chains

To install the tire chains, front lip 113 of the front end of each of the loaded trays is butted against a drive wheel tire with the longitudinal axis of each tray in the center of the path of the tire. The trays may be placed ahead of the tire and the vehicle driven in low gear onto them, in which case the connections between the ends of the side chain will occur behind the tire (i.e., toward the vehicle's backup lights). Alternatively, the trays may be placed behind the tire and the vehicle driven in reverse onto them, in which case those connections will occur ahead of the tire (i.e., toward the vehicle's headlights). The user will determine which, based on the design of the particular vehicle and possibly other circumstances, as will be described later in the discussion of setup.

Figure 28:
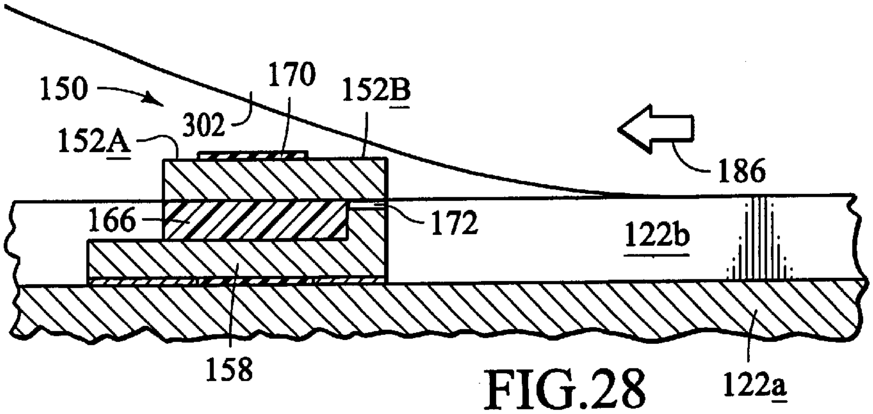
FIG. 28 is a view similar to FIGS. 26 and 27 with the trailing edge of the tire just having passed over the switch, which is in an open position.

The vehicle is driven slowly in a straight line onto the tray so that the tire climbs over front wall 118 and onto front support 122. The tire then passes onto switch 150, which has been secured to support 122 as previously described in the description of the tray, in a specific forward-and-rearward position predetermined in a manner which will be described later in the discussion of setup. As shown in FIG. 26, the tire 302 is exerting a downward force on both front bearing surface 152A and rear bearing surface 152B of top element 152, so that switch 150, which is within the footprint of the tire, remains open. The tire continues over switch 150 in the direction indicated by arrow 184 until the trailing edge of the tire lifts off bearing surface 152A, while still exerting a downward force on bearing surface 152B. This causes top element 152 to rock about fulcrum 174, so that the switch closes, as shown in FIG. 27. The closing of the switch initiates a visual or audible signal to the driver, signalling the driver to apply the brakes and stop the vehicle. If, after the vehicle is stopped, the signal continues, the driver knows that the tire is in the correct position. (The nature of the signal will be discussed in detail later.) If, on the other hand, the driver does not stop the vehicle in time, and allows the movement of the vehicle to continue until the trailing edge of the tire no longer contact bearing surface 152B, resilient pad 168 and resilient compression band 170 cause the switch to resume the open position as shown in FIG. 28, and the signal ceases. In that event the driver will drive the vehicle in the opposite direction (i.e., in the direction of arrow 186), whereby the switch will close again as shown in FIG. 27 as the vehicle is driven, and stop the vehicle when the signal begins again. If the driver overshoots again, he will move the vehicle in the opposite direction and continue the process—forward, reverse, and so on—until the signal continues after the vehicle is stopped.

Tests have shown, however, that the tire can be positioned quite accurately and quickly with respect to the vehicle supports, with only a limited number of attempts. The continuous feedback of the signal tells the driver not only when the tire is in the correct position, but also informs the driver of the length of the correct zone and therefore of the appropriate balance of throttle pressure, braking reflex, and braking force. Typically a driver, after the experience of one or two successful stops, will stop in the correct position on the next first attempt.

More fundamentally, the ability to sense and signal whether or not the tire is within a small zone on the tray is superior to the ability to merely sense and signal whether or not the tire has passed a point on the tray. The former provides two limits. The latter provides only one, and hence cannot eliminate variables such as vehicle speed, throttle pressure, throttle reaction time, braking reaction time, variations in these from driver to driver, and variations produced by external conditions such as grade, road surface, and the presence of snow or ice.

Adapter 181 may be employed as desired to shorten or lengthen this sensing and signalling zone by changing the effective profile of the top surface of switch 150. In the position shown in FIG. 29, with the maximum height of the switch surface toward the front of the tray, adapter 181 shortens the zone. (It can be seen from FIG. 28 that if a projection were to extend upward from surface 152A for a distance greater than the distance to the tire, the tire could not contact surface 152B and the zone would be in effect reduced to zero.) On the other hand, in the position shown in FIG. 30, with the maximum height of the switch surface toward the rear of the tray, adapter 181 lengthens the zone by causing switch 150 to close sooner. As an alternative to the adapter, the signalling zone may be shortened or lengthened by varying the distance by which the top surface of top element 152 projects above the plane of the top surface of front support left and right portions 122*b*, 122*c*, as for example by shims between center section 122*a* and base 112.

If the vehicle is driven too far toward the rear of tray 110 or is inadvertently driven in the wrong direction, interior walls 140 and exterior walls 114, 116 will protect tool 10 from damage due to the weight of the vehicle. In addition to preventing the tire from contacting tool 10, interior walls 140 keep chain in well 142 from being displaced onto the top of tool 10 and then damaging the tool when the tire is driven onto this overlying chain.

Now, with the vehicle stopped, the emergency brake applied, and the engine turned off, the user grasps the handle of the tool and draws it, with the chain to which it is connected trailing it, upward and circumferentially around the tire, so that it slides over the surface of the tire and is guided along it in a circular arc about the axis of rotation of the wheel. In order to prevent the cross chains from snagging on the edges of the tread, as is likely to occur at side lugs on the tread when the tires are snow tires, the user may initially keep the tire chain on the top of the tread. This is accomplished by using the hand which is holding tool 10 to bend handle 16 at hinge 90 so that handle 16 and arms 12, 14 form a diamond shape, with inner arm claws 28, 44 and outer arm claws 64, 82 and the chain connected to them coming together. As that hand draws tool 10 circumferentially around the tire, the cupped other hand is used as a guide to keep the trailing chain on the tread. This is continued until the side chains become taut, which will occur when the claws are slightly past the vertical. Then the user allows the tool to resume its normal "U" shape and brings the side chains down on the sidewalls. If the user elects not to keep the tire chain on the tread in this manner, as he or she probably would elect if the tires have no lugs at the edges of the tread where the tread and the sidewalls intersect, the cross chains will be guided along the tread and sidewalls, and the side chains will be guided along the sidewalls.

The user tensions the side chains and cross chains by pulling on handle 16 while eliminating any snags and local twists with the other hand. This completes the draping operation, during which the flexibility of handle 16 provided by the resilient hose has helped to prevent tool 10 from hanging up on the body of the vehicle. The result is depicted in FIG. 31, which shows tire 302 mounted on rim 304 driven by axle 306, and tool 10 connected to the fastening elements of the side chains. Tire 302 has tread 302*a*, inner sidewall 302*b*, and outer sidewall 302*c*. Handle 16 is now bridging the tread of tire 302, with the arms extending along opposite sidewalls. Claws 28, 44 of inner arm 12 are connected to inner fastening link 212L of inner side chain 212. Resilient sleeve 310 isolates fastening link 212L, as previously mentioned with respect to loading the tray. The user (not shown) is standing on the side of the wheel away from the viewer, facing the viewer and the outer sidewall and holding handle 16 with his or her right hand much the same way as one would hold the body of a hardshell crab to avoid being pinched by the crab's claws.

Next, the outer fastening element on the free end of the tire chain lying in the front of the tray is picked up and hung loosely on the outer fastening element connected to the tool. Alternatively, hanger 76 may be pivoted away from handle 16 and the free outer fastening element hung on hook 77. This reduces the weight of the free chain which the user must soon support when picking up and handling the inner fastening element and keeps the tire chain from inadvertently being allowed to fall behind the wheel.

FIGS. 32 and 33 show what happens next for both cases—when tool 10 is connected to links and when it is connected to hooks, respectively. The user picks up the free inner fastening element (or the resilient tube surrounding the side chain links between it and the nearest cross chain) from the tray and brings it up into the channel formed by flanges 20*b*, 20*c* and web 20*a* of member 20 of inner arm 12. Using the flanges 20*b*, 20*c* as a guide, the user slides the free fastening element (212L or 212H) toward the claws. When the fastening element contacts concave inclined surface 30*c*, the user, feeling that it is close to the claws, moves it along that surface, whose concavity centers the fastening element as it approaches the claws. The fastening element (212L or 212H) leaves surface 30*c* and moves the remaining distance to the mating fastening element connected to the claws. As shown in FIG. 32, when the connected fastening element is link 212L, mating hook 212H passes above link 212L (out of the longitudinal axis of arm 12), remaining in contact with link 212L, until the end 212H*e* of hook 212H is within the interior of link 212L. Then hook 212H is withdrawn into its position of final engagement with link 212L, which is conventional (not shown). The necessary passage of hook 212H over link 212L with adequate clearance is possible because of the relatively small portions of the link and its interior space which are obstructed by the claws, as previously described with respect to loading the tray. As shown in FIG. 33, when the connected fastening element is hook 212H, link 212L remains on the longitudinal axis of arm 12, rides over (away from the tire) the end 212H*e* of hook 212H, and is withdrawn to its conventional position of final engagement (not shown). At this point latch 32 is unlatched and latch top panel 32*b* and the bottom surface of angular member 46 or handle 16 are squeezed as previously described, opening claws 28, 44 and releasing the fastening element 212L or 212H from inner arm 12. The inner side chain is now fully connected.

The user then unhooks the loosely hanging outer fastening element (214L or 214H) and connects it securely to the mating outer fastening element (214H or 214L) connected to tool 10. Squeezing latch top panel 70*b* and the bottom surface of handle 16 releases the fastening element from claws 64, 82 as previously described. Alternatively, the fastening element may be released from the claws before the free fastening elements are connected. The outer side chain is now fully connected.

It will be understood that while it is advantageous to connect the inner fastening element and the mating element before the fastening element has been released from the claws, as shown in FIGS. 32 and 33 and just described, the user may elect to reverse the sequence and release the fastening element from the claws first and then connect the two fastening elements without using the inner arm as a guide.

The other tire chain is installed on the other driving wheel in a similar manner, after which the tools and empty trays are stored and the vehicle is driven off the tray in the opposite direction, so that it goes back over the front of the tray. If the vehicle is inadvertently driven in the wrong direction and passes over rear wall 114 of tray 110, the tray will not be damaged.

As previously mentioned in the summary of the invention, the tire chains can be installed in most cases without the need for the user to see the inner fastening elements being connected or to hold them with both hands simultaneously, which often has required the user to lie on the ground when installing tire chains in the conventional manner. There are several reasons. First, the user knows that the tool has prevented the side chain from twisting during storage, handling, or installation, since one end of the tire chain is still connected to the tool, the other end is still held by the chain element holder, and the tire chain the tool cannot be rotated about the axis of the handle, as could be possible with a more flexible or differently configured tool. Second, the tool positively fixes the location of the connected fastening element. Third, the tool guides the free fastening element into contact and engagement with the connected fastening element. Fourth, the tool prevents the connected fastening element from moving or rotating away from the free fastening element in response to pressure from it. Fifth, if the tool is connected to a fastening hook, the tool prevents the hook from snagging on another portion of the tire chain.

In addition, the invention eliminates the need for the user to have both hands holding the mating inner fastening elements at the inner sidewall, which, like the need to see the fastening links, could also require him or her to lie on the ground, since balancing on one's feet may be difficult under these circumstances. Instead, the user is able to apply tension to the inner side chain through the tool, which one hand is holding by the handle.

Setup

In order to obtain the maximum benefit from the invention, it is important to stop the tire on the tray at the location which will place the fastening elements of the chain in the optimum angular position on the tire when the tire chains are properly tensioned on the sidewalls and the fastening elements are ready to be connected. Predetermining the location of switch 150 on front support 122, as mentioned earlier, allows this optimum connection angle to be achieved.

The optimum connection angle will vary with the design of the particular vehicle. On some vehicles, particularly trucks, buses, graders, and other heavy equipment, clearance may not be a factor, either because the tires are sufficiently spaced from the vehicle's fenders or because there are no fenders at all. For these vehicles the optimum connection angle may be within the range of approximately 45 to 170 degrees from the bottom of the tire, in the direction away from chain well 142. An angle less than approximately 45 degrees will place the fastening elements so close to the ground that arms 12, 14 of tool 10 cannot come close enough to the tangent of the side chain circle to enable inner arm 12 to properly guide the free fastening element to the mating element connected to the tool. An angle greater than 170 degrees will prevent the chain from being properly draped on the tire. Within the range of 45 to 170 degrees, the less the angle, the lower the user will have to reach, and if the angle is less than 90 degrees, the farther around behind the tire. At the other end of this range, the greater the angle, the greater the weight of the free end of the chain to be lifted to the height of the connection.

For most other vehicles, including passenger cars, clearance win be a factor, and the connection angle will be limited to the lower angles of that range which place the elements being connected, or at least the handle of the tool and the knuckles of the users hand gripping it, below the body of the vehicle. As a general rule, the connection should be made at about 90 degrees or, if there is insufficient clearance at 90 degrees, at the lesser connection angle which allows sufficient clearance for the connection to be made.

Unless there is a circumstance restricting movement of the vehicle (e.g., a parked car), the user will have decided in advance whether to drive the vehicle onto the tray in low gear or reverse, based on the design of the body of the vehicle. The presence of mud guards close to the tire may militate for reverse, for example. If the vehicle is a passenger car or light truck with rear wheel drive, it usually will be preferable to drive it in low gear onto the tray. With front wheel drive passenger cars, the preferred practice varies greatly with the design of the front fenders, although these vehicles tend to be more forgiving than rear wheel drive vehicles, since the body is spaced sufficiently far from the front wheel to allow the wheel to turn fully to the right and left. (While the description of the invention has assumed for convenience that the tire chains are being installed on only drive wheels, this is not always the case, it being well known that tire chains may be used on non-drive wheels to enhance braking and steering.) The invention is not intended to be used for a tire which is already stuck.

The location of switch 150 for particular tires and tire chains should be predetermined at or before the first time the tire chains are loaded into the tray in anticipation of actual use. First, the switch is detached from support 122 and reattached as far as possible to the rear of support 122. Next, the tray is loaded into the tray as shown in FIG. 17, with the endmost cross chain in front transverse channel 130. The vehicle is then driven onto the tray and stopped when switch 150 is in the closed position shown in FIG. 27. If the resulting connection angle is too great, the vehicle should be driven toward the front end of the tray to produce a lesser angle. If, on the other hand, the resulting connection angle is too small, then the vehicle should be driven off the a tray, the tire chain in the tray shifted so that the two endmost cross chains are in front transverse channel 130, and switch 150 moved to a more forward location on support 122. (The length of support 122 is selected so that the range of the possible positioning of switch 150 is roughly equal to the center-to-center spacing of the cross chains, which in the case of the ladder-type chains shown is 5.0 or 5.25 inches.) If necessary, more than two cross chains may be placed in channel 130.

In any event, the user should by trial and error position the tire and actually drape the tire chains around the tire and tension them to achieve and confirm both the optimum connection angle and the optimum chain length (generally, as short as possible) and to put sleeves 310 on the ends of the side chains on which the fastening element is a link. Similarly, the optimum chain length should be determined for, and sleeves applied to, the other tire chain of the set and its tire. As mentioned earlier, only the tray on the driver's side will employ a switch. If the two tire chains in the set are identical to each other rather than mirror images of each other, as discussed earlier in the description of the tool, the user needs to take into account the distance, on the tire chain of the pair which will be in the tray without the switch, between the fastening element at the free end of the side chain (i.e., the end in chain element holder 119) and the closest cross chain. If that distance is appreciably longer than the corresponding distance on the tire chain in the tray with the switch, the optimum connection angle to be achieved by the switch should be reduced accordingly.

Next, with the tire at the position which will result in the optimum connection angle, switch 150 should be moved and secured to support 122 so that it contacts the rear profile of the tire, as shown in FIG. 31.

It should be noted that as a practical matter there is some latitude in achieving the optimum connection angle, since the tire chain laid out in the tray can be slid toward the front or rear of the tray after the tire has stopped. Such sliding is limited to the distance between the vehicle supports, which is about 2.25 inches in the embodiment shown in FIG. 17. This equates to a total of approximately 12 degrees, or a tolerance of ±6 degrees, for a typical passenger car tire having a diameter of 24 inches. The sliding is limited by the widest portions of supports 124 and 126, which keep the cross chain hooks from sliding past them or becoming stuck between a support 124, 126 and a side wall 116. Before the chains are slid, the cross chain(s) in transverse channel 130 should be placed over the front of support 122; otherwise, a relatively short cross chain may catch on the front surface of support 122 if the tire chain is being slid toward the rear of the tray.

Additional advance preparation will further simplify loading and installation. The chains and tool may be painted or otherwise marked so that the fastening elements and the corresponding tool arm can be quickly identified. I recommend painting the inner fastening elements and tool arms one color and the outer fastening elements and tool arms a contrasting color. Also, to identify and distinguish the side chains, the outer side chain links to which the tensioners will be connected can be painted the outer color.

Signaling the Driver

The selection of the particular means to signal the driver is primarily a function of expense.

An effective and convenient signal is a light on the vehicle's instrument panel which is illuminated when the tire is in the zone. Such a light would be actuated by a remote keyless entry-type device and battery in compartment 184, in accordance with known technology.

Alternatively, an electronic device for emitting an audible sound, could be placed in compartment 184 with a battery, preferably with a manual on-off switch in the circuit with switch 150 so that the user could turn off the sound as soon as he leaves the stopped vehicle, thereby sparing himself and others the annoyance of having to listen to it for an extended period. A chip in the device which automatically turns off the sound at a fixed interval after it begins would serve the same purpose. Suitable piezo and electromagnetic buzzers and sirens are available from Radio Shack, U.S. Electronics, Inc., St. Louis, Mo., and, Kayer Industrial Co., Ltd., Hong Kong.

An inexpensive third alternative is a light wired to one pair of terminals 180 and placed in the driver's view. An example is an ordinary flashlight wired with terminals 180 in parallel with the flashlight's own on-off switch. Alternatively, a jack with an integral normally closed switch can be substituted for terminals 180, in series with the on-off switch. The flashlight can be attached to the driver's front fender with a magnet or, if the tray is at a rear wheel, to the side of vehicle to the rear of the driver and directed to the outside rear view mirror. Such a flashlight can carry its own battery. If the flashlight has plug-in jacks for the wires, it may be used as a normal flashlight when it is not being used with the tray. Examples of flashlights with suitable jacks are the continuity tester flashlights available from Bright Star Industries, Wilkes-Barre, Pa. As an alternative to a magnet, the light can be attached to the windshield or other window glass by a suction cup. Clear suction cups of the type available from Presto Galaxy Suction Cups, Inc, Greenpoint, N.Y. allow an embedded or adjacent L.E.D. or small incandescent lamp to be seen through the suction cup and the glass.

Dimensions

The length of arms 12, 14 should be sufficient to allow the claws to place the fastening links at the widest part of the tire, while the arms are held more or less in alignment with the end links of the side chain and tangent to the side chain circle. This enables the user to pull on handle 16 to properly tension the side chains and cross chains, as mentioned above. On the other hand, the length of arms 12, 14 should be no longer than necessary, to minimize the possibility of interference between the tool and the vehicle and to keep the length of tray 110 to a minimum. I have found that an arm length in the range of from 4 to 6 in. is suitable for typical passenger car tires ranging from 13 to 16 in. bead diameter and from 6.75 to 9.25 in. maximum width. An arm length of 4.75 inches is a good compromise which will enable a single tool to work with most passenger car tires.

The spacing between arms 12, 14 should be greater than the maximum width of the tire but not so great as to cause interference with the vehicle. The optimum is approximately the maximum width of the tire plus 1.0 in. The spacing of arms 12, 14 can be easily changed by cutting or replacing the resilient member of handle 16.

The angle at the juncture of each arm and the handle and the rigidity of the tool there prevent the handle from being rotatable about its own longitudinal axis, because the tool cannot pass through the polygon formed by the tool, the closest cross chain, and the side chains between them. Such rotation would twist the side chains. This angle should be from 45 degrees to 90 degrees, and, to conform to the profile of most passenger car tires, is preferably about 60 degrees.

The minimum interior width of the tray (i.e., the distance between the interior surfaces of side walls 116) should be sufficient to allow the tool to fit between them, and thus should be in the range of about 8.0 to 11.0 in. for the passenger car tire sizes mentioned above. These widths are sufficient to prevent the tire from trapping a side chain in a longitudinal channel 138, unless the path of the tire is badly misaligned with the tray. Excess tray width has no disadvantage other than cumbersomeness. The distance between transverse channels 130, 132, 134, 136 should correspond to the distance between the cross chains as measured along a side chain (conventionally 5.0 or 5.25 in.).

Constructions Details

In the preferred embodiment shown and described, tool 10 is made from 0.125×1.0 in. steel bar, 0.0625×1.0 in. square steel tube, 0.75 in. outside diameter radiator hose, and 0.50 in. plexiglass sheet, while tray 110 is made from wood of 0.75 and 1.5 in. thicknesses. In another embodiment of the installation tool a hinged wood handle is used. Switch 150 is made from square metal angle, plexiglass sheet, shoe insole material, all 0.125 in. thick, and bicycle inner tube. Interior walls 140 are made from metal channel 0.125 in. thick. It will be understood that these materials and other construction details have been described with particularity in order to provide a full disclosure of an operating embodiment of the invention, not to suggest the ultimate refinement of a tool or a tray embodying the principles of the invention. Of course, the tool and tray could be made of other materials, including recycled materials. For production on a commercial scale which would justify substantial capital investment, for example, tool 10 could be made by injection molding a suitable polymeric resin, such as polypropylene or nylon, which may be fiber-reinforced. It may be possible to form the claws and/or hinged handle integrally with the arm members. The tray could also be molded from a similar such resin. It will be further understood that the designs of the tool and tray can and would be expected to be changed to accommodate, and take advantage of, the different materials, while continuing to use the fundamental principles and relationships described herein.

Alternative Embodiments

Figure 4:
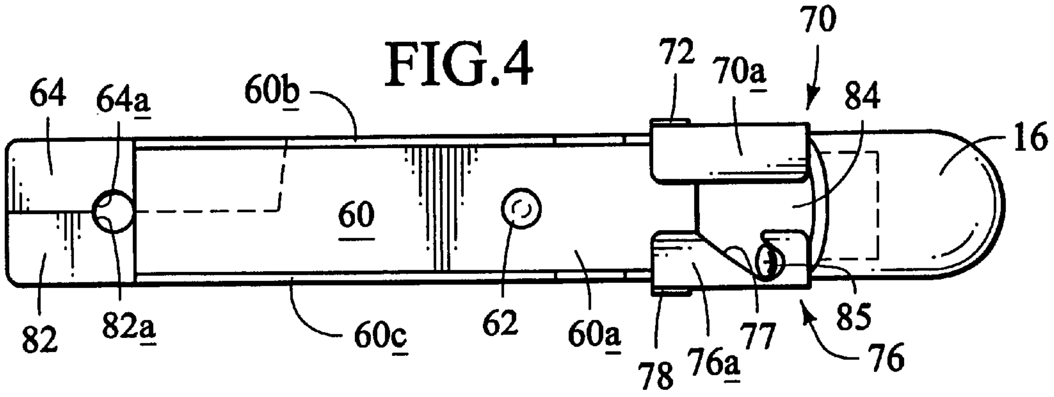
FIG. 4 is a right side view of the tool shown in FIG. 1, showing the outer arm.
Figure 5:
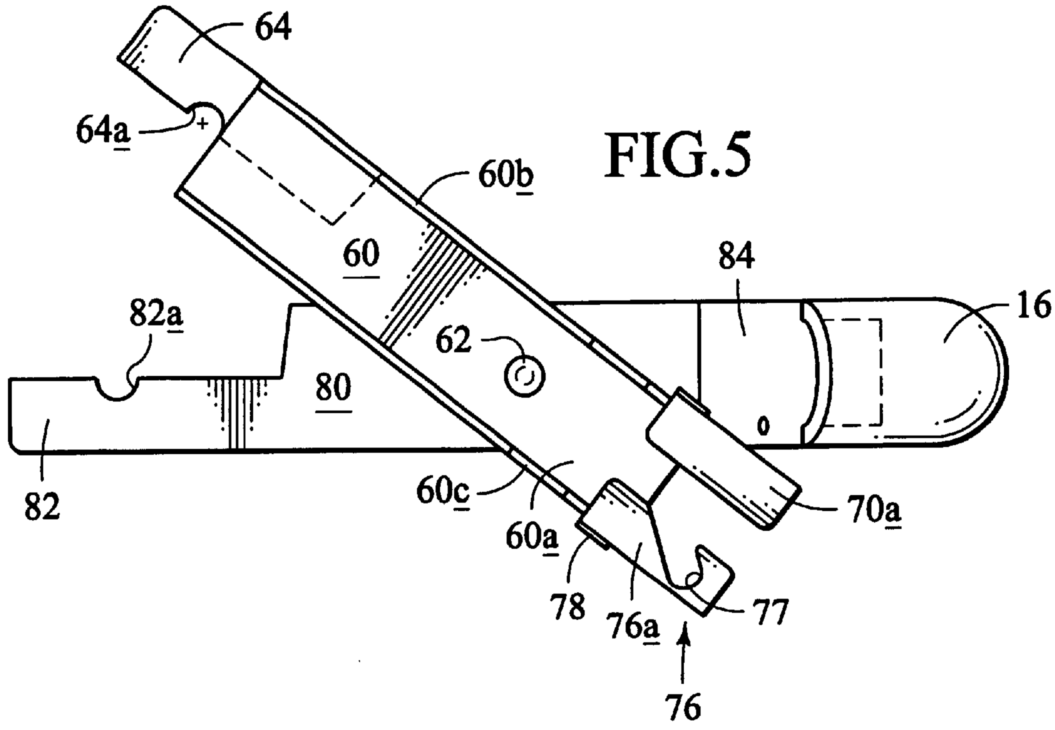
FIG. 5 is a view similar to FIG. 4, with the stop screw removed and the claws in an exaggeratedly open, releasing position.

In an alternative embodiment of the installation tool, the distance between openings 64*a*, 82*a* and the ends of claws 64, 82 (as shown in FIGS. 4 and 5) can be increased by about 0.675 in., with a rectangular cutout in each extended portion to receive the shank of outer hook 214H. The resulting structure, which can be best visualized from FIG. 33, would allow the extended portion to positively grip the shank. This would allow the height of the claws (as shown in FIGS. 4 and 5) to be reduced, since in the embodiment shown in the drawings this height is necessary to prevent the hook from rotating out of the claws during storing and handling.

In another alternative embodiment of the installation tool, the outer claws can be similar to the inner claws, but with grooves shaped to receive either a chain link or the curved, J-shaped end portion of the locking hook. In still another alternative embodiment, the outer arm can be identical to the inner arm shown in the drawings, but with claws similar to outer claws 64, 82 projecting further outwardly from both arms; in this embodiment the two tools of a pair will be identical, but their arms will be about 0.875 in. longer. In yet another alternative embodiment, the handle can be offset from the plane of the arms, so that it would appear to be all or part of an inverted "U" in a complete front view of the tool shown in FIG. 1. This would enable the rear of the arms, like the front of the arms, to be disposed along the sidewalls inwardly of the tread, thereby being closer to the free fastening element which will be guided along the inner arm but at the expense of increasing the height of the tool and hence the tool compartment in the tray. The arms could be curved so they lie along the side chain circle. In an additional alternative embodiment, handle 16 telescopes in two places—between hinge 90 and angular member 46 and between hinge 90 and angular member 84—so that the distance between arms 12, 14 may be reduced while tool 10 is stored in tray 110. This eliminates the width of tool 10 as the factor determining the width of tray 110, as previously described in the discussion of dimensions, in which case the width of tray 110 should be at least the maximum width of the tire.

In an alternative embodiment of the tray, the vehicle supports are shaped to correspond to the spaces between cross chains in a Z or diamond configuration, rather than a ladder configuration.

It will be understood that, while presently preferred embodiments of the invention have been illustrated and described, the invention is not limited thereto, but may be otherwise variously embodied within the scope of the following claims. It will also be understood that the method claims are not intended to be limited to the particular sequence in which the method steps are listed therein, unless specifically stated therein or required by description set forth in the steps.

I claim:

1. A method of installing, on a tire mounted on a rim of a vehicle wheel, an untwisted tire chain consisting of elements which form side chains and cross chains extending between the side chains, the tire having a tread joining an inner sidewall and an outer sidewall, and the elements comprising links and, at one end of each side chain, a fastening hook for connection with a mating element at the other end of that side chain, which method comprises the steps of:

(a) providing an installation tray which comprises a base, walls, vehicle supports, longitudinal channels, transverse channels, and a well;

(b) providing a separate U-shaped installation tool which comprises:

(i) a transverse member forming the base of the "U";

(ii) two arms extending away from opposite ends of the transverse member; and (iii) an engaging mechanism on each arm for connecting the arm to an element of a side chain, the engaging mechanisms including components which are relatively movable to both a first, confining configuration and a second, releasing configuration and which are shaped and dimensioned so that in the confining configuration the engaging mechanisms will confine elements of the side chains and so that in the releasing configuration the engaging mechanisms will release those elements;

(c) providing the tire chain arranged in the tray and connected to the arms of the tool so that:

(i) a portion of the tire chain is laid out with its side chains disposed in the longitudinal channels and with its cross chains disposed in the transverse channels;

(ii) a portion of the tire chain is disposed in the well;

(iii) at the end of the tire chain adjoining the portion disposed in the well, an element of each side chain is confined by an engaging mechanism in the confining configuration; and (iv) the tire chain is in an untwisted condition;

(d) placing the tray in the path of the tire with the side chains parallel to the path;

(e) driving the vehicle onto the tray;

(f) stopping the vehicle when the tire is resting on the vehicle supports;

(g) grasping and pulling up the transverse member of the tool with the tire chain connected to and trailing the tool;

(h) drawing the tool and the trailing chain upward and circumferentially around the tire, so that at least cross chains slide over the tread and are guided along it in a circular arc, until the tool is past the top of the tire and the trailing chain is supported by the tire;

(i) tensioning the trailing chain substantially in its desired position along the sidewalls of the tire, with the transverse member of the tool extending across the tread, and with one engaging mechanism adjacent the inner sidewall and the other engaging mechanism adjacent the outer sidewall;

(j) moving the engaging mechanisms from the confining configuration to the releasing configuration, thereby releasing the side chain elements and disconnecting the side chains from the arms of the tool;

(k) removing the tool; and (l) driving the vehicle off the tray.

2. A method according to claim 1 wherein in the confining configuration the engaging mechanisms confine the chain elements of the side chains sufficiently positively and securely that the side chains and the arms of the tool remain connected during handling and installation of the tire chain, irrespective of their relative positions and irrespective of the directions of forces pulling on them, until the chain elements are released.

3. A method according to claim 1 wherein:

(a) the tray further comprises chain element holders; and (b) the tire chain is provided arranged in the tray so that, at the end of the tire chain adjoining the laid-out portion, elements of the side chains are disposed in the chain element holders and restrained thereby from horizontal and rotational movement, whereby the entire tire chain must remain in the untwisted condition at least until an engaging means is opened or a chain element is removed from a chain element holder.

4. A method according to claim 1 wherein:

(a) the tool further comprises user-actuatable latches for preventing movement of the engaging mechanisms;

(b) the latches are latched while the engaging mechanisms are in the confining configuration; and (c) the latches are unlatched prior to moving the engaging mechanisms to the releasing configuration.

5. A method according to claim 1 wherein, when the tool and the connected chain trailing it are being drawn circumferentially around the tire:

(a) the transverse member of the tool extends across the tread;

(b) the cross chains of the trailing chain slide over and are guided along the tread and the inner and outer sidewalls; and (c) the side chains of the trailing chain slide over and are guided along the sidewalls.

6. A method according to claim 1 wherein:

(a) the transverse member of the tool is articulated; and (b) when the tool and the connected chain trailing it are being drawn circumferentially around the tire, the inner and outer engaging mechanisms are moved close to each other so that the trailing chain, while being pulled over the tread, remains on the tread, so as to avoid snagging the cross chains on the edges of the tread where the tread and the sidewalls intersect.

7. A method according to claim 1 wherein:

(a) the tray further comprises a tool compartment;

(b) the tool is disposed in the tool compartment when the tire chain is arranged in the tray and the tool is connected to the tire chain; and (c) the tire chain, tray, and tool, as so arranged and connected, are stored prior to being placed in the path of the tire.

8. A method according to claim 7 wherein:

(a) the tray further comprises stacking lugs and stacking recesses;

(b) two sets of the tire chains, trays, and tools so arranged and connected are provided; and (c) one tray is stacked on the other tray during storage, with the stacking lugs of the lower tray fitting in the stacking recesses of the upper tray.

9. A method according to claim 1 wherein, before the element of the side chain adjacent the inner sidewall is released from the engaging mechanism, the mating element at the other end of that side chain is brought into contact with and connected to that unreleased element, using the arm of the tool adjacent the inner sidewall as a guide.

10. A method according to claim 9 wherein:

(a) the tool further comprises longitudinal flanges on an arm of the tool;

(b) that arm with the longitudinal flanges is adjacent the inner sidewall; and (c) the longitudinal flanges guide said mating element to the element connected to the engaging mechanism.

11. A method according to claim 10 wherein:

(a) the tool further comprises an inclined surface between the longitudinal flanges; and (b) the inclined surface, as well as the longitudinal flanges, guides said mating element to the element connected to the engaging mechanisms.

12. A method according to claim 9 wherein a resilient sleeve isolates said mating element at said other end of said side chain by surrounding and compressing together elements permanently connected directly to said mating element.

13. A method according to claim 1 wherein:

(a) the tray further comprises an adjustable position-indicating device for issuing a signal when the tire has reached an optimum position with respect to the tray;

(b) before the vehicle is driven onto the tray, an optimum stopped position of the tire with respect to the tray and the tire chain is determined and the adjustable position-indicating device is moved lengthwise with respect to the tray and secured to the tray for indicating subsequently when a tire has reached that optimum position so determined; and (c) after the vehicle is driven onto the tray, the vehicle is stopped in response to a signal issued by the adjustable position-indicating device.

14. A method according to claim 13 wherein:

(a) the adjustable position-indicating device comprises a tire-actuated switch;

(b) the predetermined optimum position is a zone defined by boundaries spaced along the longitudinal axis of the tray; and (c) the adjustable position-indicating device causes a signal to issue continuously when, and only when, the tire is in the zone, thereby enabling an immediate determination of whether or not the zone was overshot during the time period which began when the signal began to issue and ended when the vehicle was stopped.

* * * * *